Dec. 11, 1962 G. P. SARRAFIAN 3,068,452

MEMORY MATRIX SYSTEM

Filed Aug. 14, 1959 12 Sheets-Sheet 1

INVENTOR

George P. Sarrafian

BY Stevens, Davis, Miller & Mosher

ATTORNEYS

Dec. 11, 1962 G. P. SARRAFIAN 3,068,452

MEMORY MATRIX SYSTEM

Filed Aug. 14, 1959 12 Sheets-Sheet 2

INVENTOR

George P. Sarrafian

BY Stevens, Davis, Miller & Mosher

ATTORNEYS

INVENTOR
George P. Sarrafian

BY Stevens, Davis, Miller & Mosher
ATTORNEYS

Dec. 11, 1962 G. P. SARRAFIAN 3,068,452

MEMORY MATRIX SYSTEM

Filed Aug. 14, 1959 12 Sheets-Sheet 4

INVENTOR

George P. Sarrafian

BY Stevens, Davis, Miller & Mosher

ATTORNEYS

INVENTOR
George P. Sarrafian

BY Stevens, Davis, Miller & Mosher
ATTORNEYS

George P. Sarrafian

BY Stevens, Davis, Miller & Mosher
ATTORNEYS

INVENTOR
George P. Sarrafian

BY Stevens, Davis, Miller & Mosher
ATTORNEYS

INVENTOR
George P. Sarrafian

BY Stevens, Davis, Miller & Mosher
ATTORNEYS

Dec. 11, 1962 G. P. SARRAFIAN 3,068,452

MEMORY MATRIX SYSTEM

Filed Aug. 14, 1959 12 Sheets-Sheet 9

INVENTOR
George P. Sarrafian

BY Stevens, Davis, Miller & Mosher
ATTORNEYS

INVENTOR
George P. Sarrafian

BY Stevens, Davis, Miller & Mosher
ATTORNEYS

INVENTOR
George P. Sarrafian

BY Stevens, Davis, Miller & Mosher
ATTORNEYS

INVENTOR
George P. Sarrafian

BY Stevens, Davis, Miller & Mosher
ATTORNEYS

United States Patent Office
3,068,452
Patented Dec. 11, 1962

3,068,452
MEMORY MATRIX SYSTEM

George P. Sarrafian, Dallas, Tex., assignor to Texas Instruments Incorporated, Dallas, Tex., a corporation of Delaware Filed Aug. 14, 1959, Ser. No. 833,743
4 Claims. (Cl. 340—174)

The present invention is disclosed in the copending application Serial No. 784,358 of George Philip Sarrafian, Charles L. Kettler, and George T. Baker. In this copending application, the advantages of having a memory into which more than one word could be simultaneously entered or read out are pointed out. This feature allows more rapid handling of digital data in that more data can be transferred into and out of the memory at one time. Also the system lends itself ideally to operations where double length words need to be stored in the memory to maintain a desired accuracy.

The memory is comprised of a plurality of tiers of two dimensional coincident current matrices. Digital words are stored with one digit in the same relative position in each tier. The location or address in the matrix for a word to be read in or read out is selected by the column and row selection and the coincidence of currents at the intersection of the selected column and row. A plurality of inhibit windings are provided in each tier, each linking the cores of a different part of the tier. These inhibit windings control what digit will be stored at the selected address in the respective tiers. By selecting a plurality of the rows and one of the columns in each tier, a plurality of addresses in memory can be selected. If these selected addresses are chosen such that each address is controlled by different sets of inhibit windings, two words or both halves of a double length word may be stored simultaneously.

The memory is provided with a plurality of output windings in each tier, each linking the cores of a different part of the tier. Words are read out of the matrix by selecting a column and row in each tier. By coincident current the word address at the intersection of this column and row will be selected and the word stored at this selected address will be read out on the respective output windings. By selecting a plurality of rows and a column, a plurality of intersections in each tier will receive coincident current and thus a plurality of addresses may be selected. If these plurality of addresses are selected such that each is in a part of the memory which is read out in each tier by different sets of read out windings, then a plurality of words may be read out simultaneously.

The memory is divided into sections with a plurality of different addresses comprising each section. A command signal applied to the memory system will select in which of the sections of the memory the selected address will be. An index register controls the selection of the particular address in the selected section. When a plurality of addresses are selected for read out or storage, the plurality selected addresses will always be in different sections. The index register controls the selection of the plurality of addresses so that they occupy the same relative position in each section. This feature is desirable, because it results in the two halves a double length word always occupying the same relative position in two different sections of the memory and thus simplifies the problem of keeping track of the double length word.

Further objects and advantages of the present invention will become apparent as the following detailed description of a preferred embodiment unfolds and when taken in conjunction with the drawings wherein.

Figure 15:
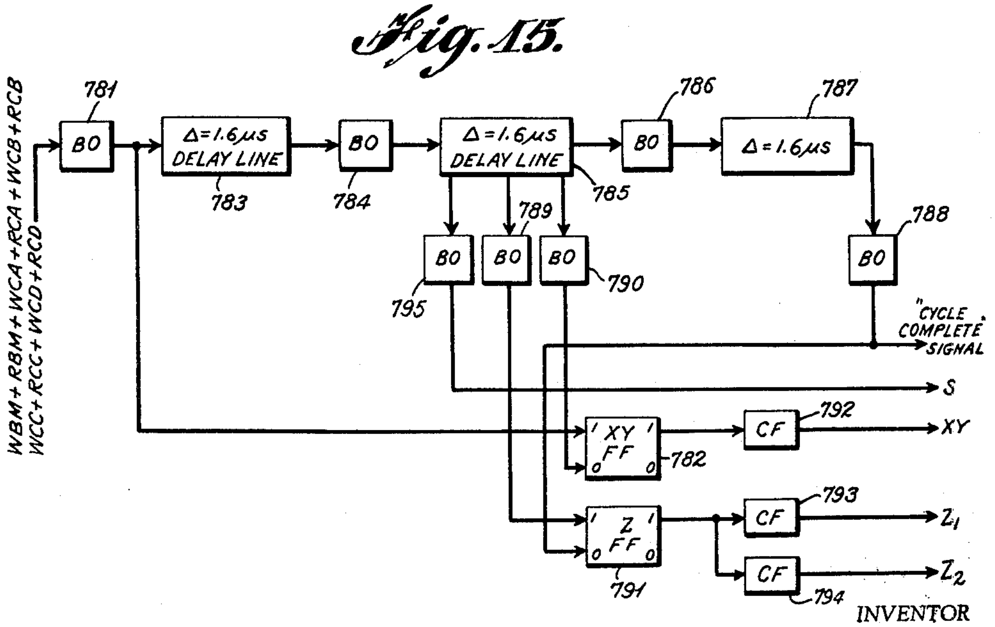
Figure 14:
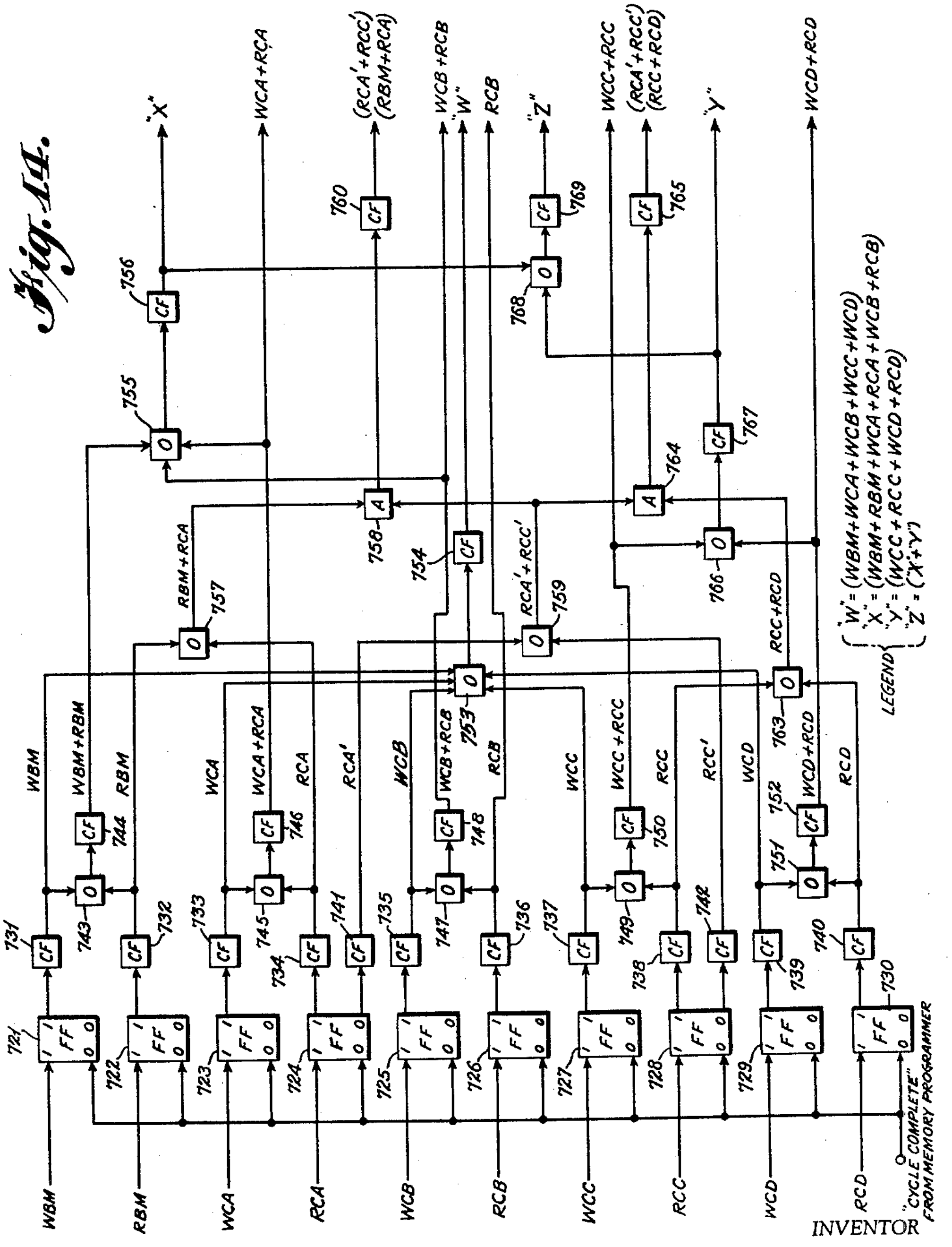

FIGURE 14 illustrates in block form the command logic for submemory selection, which stores commands to read information out of or into selected sections of the storage core matrix and applies to the different parts of the memory system the signals required to carry out these commands; and FIGURE 15 shows in block form the memory programmer which generates the waveforms necessary to carry out the reading of information out of and into the storage core matrix.

Figure 1:
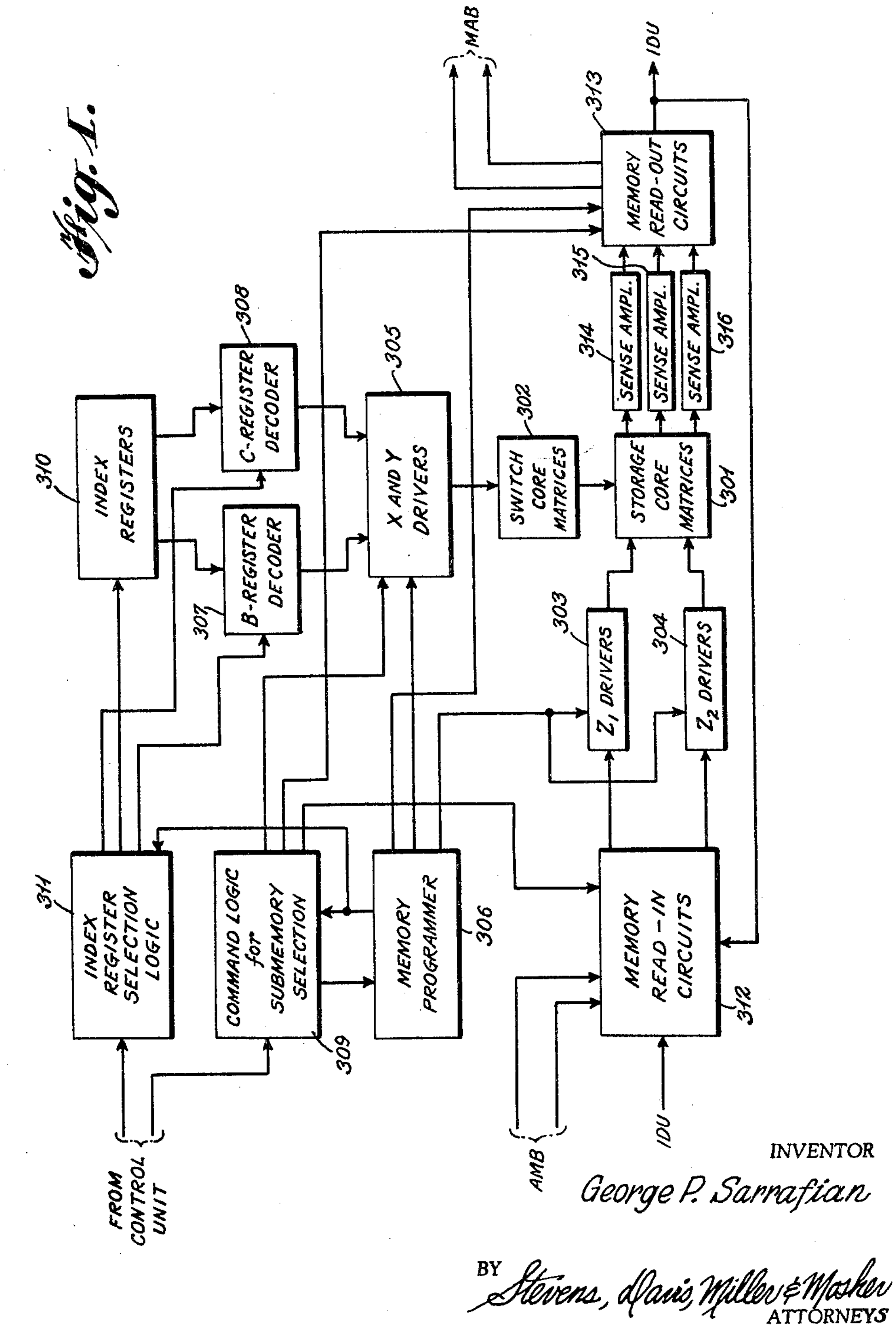
FIGURE 1 shows a block diagram of the memory system.

The memory unit can best be understood by referring to the block diagram of the entire memory unit shown in FIGURE 1 in conjunction with the FIGURES 2 through 15 illustrating details of the parts of the memory unit. The storage core matrix, designated by the reference number 301 in FIGURE 1, comprises a stack of 12 tiers of cores, each tier comprising a two dimensional coincident current matrix being just like the tier illustrated in FIGURE 2.

Assuming for purposes of description that the tiers of cores are stacked vertically, then 12 bit binary words are stored in the matrix with each bit of each word being stored in a corresponding core of a different tier in the matrix, the corresponding cores being the cores which are vertically aligned in the matrix. The storage cores of the matrix are of the ferrite type having square hysteresis loops and thus are capable of assuming two stable states and require a pulse of predetermined size and direction to switch them from one state to the other. The state which the core assumes represents the bit stored in the core.

Figure 3:
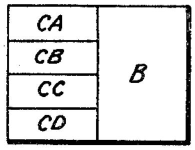
FIGURE 3 shows how the storage core matrix is divided into sections.

Each tier of cores comprises a total of 256 cores and thus the matrix has a capacity of 256 12 bit words. The memory is divided vertically into two halves, storing 128 words each and designated the B section and the C section. The C section is further divided vertically into four equal parts, storing 32 words each and designated as the CA, CB, CC and CB sections. The relative positions of these sections on each tier is shown in FIGURE 3.

Figure 2:
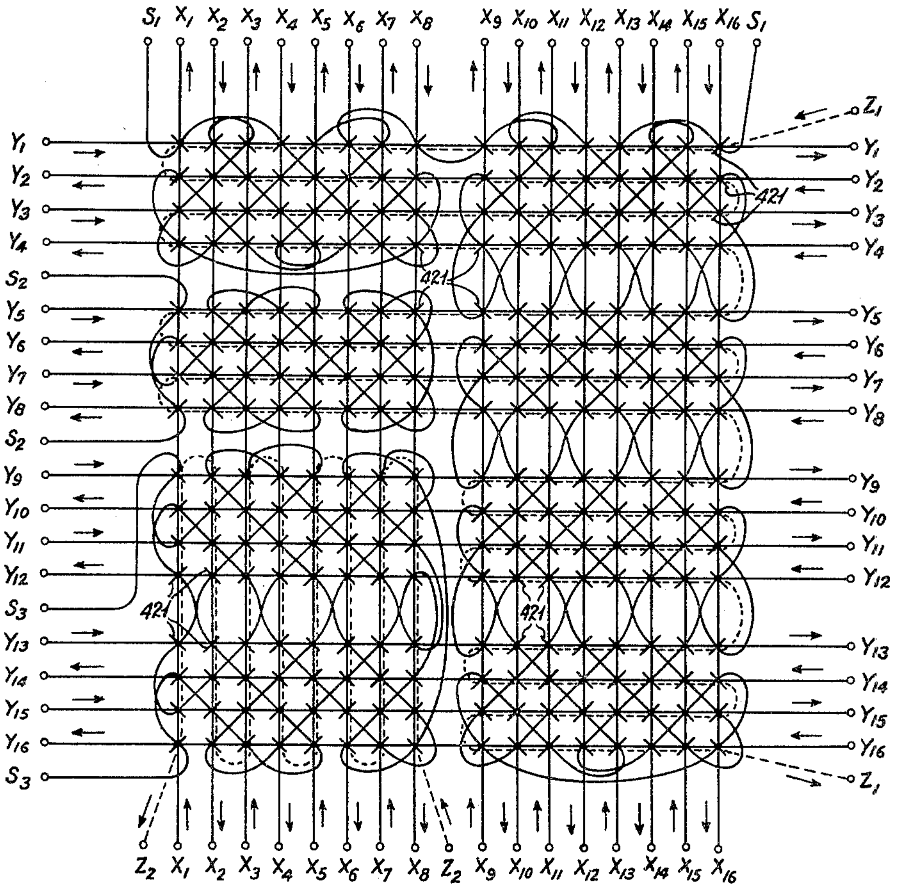
FIGURE 2 illustrates the details of one tier of the storage core matrix of the memory system.

As shown in FIGURE 2 each tier of the matrix has 16 columns of cores and 16 rows of cores. The storage cores are designated generally by the reference number 421. A different one of a series of conductors designated $X_1$ through $X_{16}$ passes through each column of cores. A different one of a series of conductors $Y_1$ through $Y_{16}$ passes through each row of cores. As groups, the conductors $X_1$ through $X_{16}$ shall be referred to as the X conductors and the $Y_1$ through $Y_{16}$ conductors shall be referred to as the Y conductors.

To select one of the cores to be switched to the opposite state, current pulses are applied simultaneously to one of the series of conductors $X_1$ through $X_{16}$ and to one of the series of conductors $Y_1$ through $Y_{16}$. The current pulses are chosen to be of such size, that the core which is commonly threaded by both the X conductor and the Y conductor will receive sufficient power from the combined currents flowing in the X conductor and the Y conductor to cause the commonly threaded core to change its state, provided the current pulses have the right polarity. The current pulses are chosen to have a small enough magnitude so that the cores which are threaded by only one of the selected X or Y conductors do not receive sufficient power to cause them to change their states.

Since all of the tiers are identical, each tier will have conductors $X_1$ through $X_{16}$ and $Y_1$ through $Y_{16}$. All of the X conductors having the same designation are connected together in series and all of the Y conductors having the same designation are connected together in series. Each series connected group of conductors which have the same designation shall be referred to by that designation.

Figure 4:
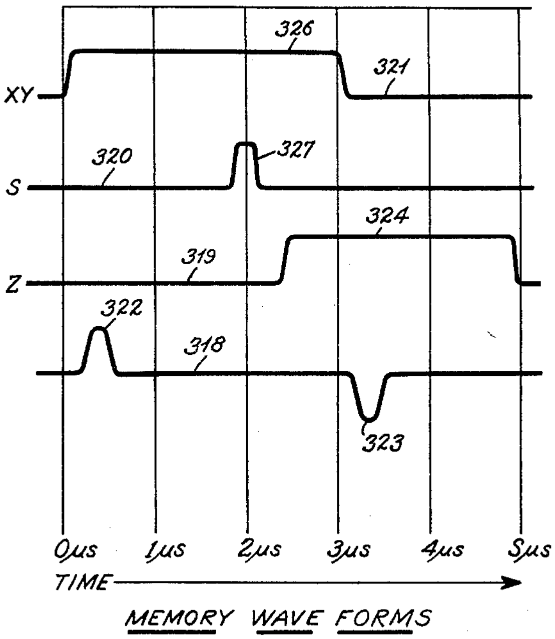
FIGURE 4 shows the electrical waveforms used in the memory system.

When a word is to be read out from or stored in the storage core matrix, the switch core matrices, designated 302 in FIGURE 1, select the desired group of like designated, series connected X conductors and the desired group of like designated, series connected Y conductors and apply simultaneously to each selected series connected groups, a current wave form 318 shown in FIGURE 4. The wave form 318 comprises a positive pulse 322 and a negative pulse 323. When the wave form is applied to a selected series connected group of X or Y conductors it is applied with such a polarity that the current of the positive pulse flows in these conductors in the direction of the arrows in FIGURE 2. The pulses 322 and 323 are of insufficient amplitude alone to cause any change of state in the cores but the core in each tier which is commonly threaded by the selected X and Y conductor will receive enough power from the pulses 322 flowing in both the X and Y conductors to cause that core to switch to a first predetermined state. This first predetermined state is used to store the binary numeral ZERO and accordingly this first predetermined state will be referred to as the ZERO state. The opposite state of each core is used to store the binary number ONE and hence this opposite state shall be referred to as the ONE state. When the pulses 322 are applied, some of the selected cores may already be in their ZERO states. These cores will be unaffected by the pulses 322 and thus after the pulse 322, all of the selected cores will be in their ZERO states. Following the application of the pulses 322, the pulses 323 will be applied to the selected X and Y conductors and as a result, all of the selected cores would tend to be switched to their ONE states so that the binary number 111111111111 would be stored in the selected address.

To store the desired binary word, the Z or inhibit conductors are used. There are two Z conductors, $Z_1$ and $Z_2$, for each tier. The $Z_1$ conductor in each tier is threaded through all the cores in the tier which are in the B section and which are in the CA and CB sections. The $Z_2$ conductor in each tier is threaded through all the cores in the tier which are in the CC and CD sections of the tier. The $Z_1$ conductors of the matrix are pulsed by the $Z_1$ drivers, which are designated in FIGURE 1 by the reference number 303. The $Z_2$ conductors of the matrix are pulsed by the $Z_2$ drivers 304. If the selected address or word position in which the binary word to be stored is in the CA, CB, or B section, the $Z_1$ driver will apply a current wave form 319, shown in FIGURE 4, to the $Z_1$ conductor of those tiers where a ZERO is to be stored in the selected core. If the binary word is to be stored in the CC or CD section, the $Z_2$ conductors of those tiers in which the selected core is to store a ZERO will receive the current wave form 319 from the $Z_2$ drivers 304. The wave form 319 is applied to the selected Z conductors at the same time that the wave form 318 is applied to the selected X and Y conductors. The wave form 319 comprises an elongated positive current pulse 324 which is applied to the selected Z conductors in the direction indicated by the arrows in FIGURE 2. FIGURE 4 illustrates the time relationship between the wave forms 318 and 319. As shown in FIGURE 4, the current pulse 324 starts in the interval between the pulses 322 and 323 and lasts until after the pulse 323. After the pulses 322 have been applied, the selected core in each tier will be in its ZERO state. Then when the pulses 323 are applied, the selected core in each tier, which does not have a pulse 324 applied on its Z conductor, will be switched from its ZERO state to its ONE state. The selected cores in those tiers which do have pulses 324 applied on the appropriate Z conductors will not be switched, because the current flowing in the Z conductors will cancel out part of the current flowing in the selected X and Y conductors so that the selected core does not receive sufficient power to be switched to its ONE state. Thus, by pulsing or not pulsing selected ones of the $Z_1$ conductors if the word is to be stored in the B, CA, or CB section, or by pulsing or not pulsing selected ones of the $Z_2$ conductors if the word is to be stored in the CC or CD sections, any binary word can be stored in any selected address.

By using both the $Z_1$ and $Z_2$ conductors, a 24 bit word or two 12 bit words can be simultaneously stored in the core matrix. The selected address in the matrix for one of the 12 bit words will be in the CA or CB section of the matrix and the selected address for the other word will be in the CC or CD section of the matrix. The cores of both selected addresses must be threaded by the same series connected group of X conductors. To carry out the operation the switch core matrices will apply the current wave form 318 to one of the Y conductor groups $Y_1$ through $Y_8$ and one of the Y conductor groups $Y_9$ through $Y_{16}$ and one of the X conductor groups $X_1$ through $X_8$. Thus, there will be two addresses at which the selected X and Y conductors intersect and at these two intersections two 12 bit words will be stored. When a 24 bit word is stored in the matrix, the two halves of the word are stored in different positions in the manner described for two 12 bit words. In the case of a 24 bit word, the CA and CC sections should be selected because of the organization of the read out circuits.

Each tier of the matrix has three S conductors, an $S_1$, and $S_2$ and an $S_3$ conductor. The $S_1$ conductors thread the cores of the CA and B sections of the matrix. The $S_2$ conductors thread the cores of the CB section of the matrix, and the $S_3$ conductors thread the cores of the CC and CD sections of the matrix. The $S_1$, $S_2$, and $S_3$ conductors are used to read out words stored in the matrix. When the cores of the selected address receive the pulses 322, the cores which store a ONE will be switched to their ZERO state and this switching will cause a pulse to be induced in the $S_1$, $S_2$, or $S_3$ conductors which thread the cores of the selected address. The cores which store a ZERO will already be in their ZERO state and therefore will not be switched and will not induce any pulses in the S conductors threading them. Twelve sense amplifiers 314 amplify the pulses induced in the twelve $S_1$ conductors, twelve sense amplifiers 315 amplify the pulses induced on the twelve $S_2$ conductors, and twelve sense amplifiers 316 amplify the pulses induced on the twelve $S_3$ conductors. The outputs of the amplifiers 314, 315, and 316 are applied to the memory read out circuits 313.

The fact that there are three S conductors in each tier, makes it possible to read out up to three 12 bit words simultaneously. When three 12 bit words or one 12 bit word and one 24 bit word are to be read out, one of the words will be in the CA section, one will be in the CB section and the third will be in the CC section. The switch core matrices will apply the current wave form 318 to one of the groups of conductors $X_1$ through $X_8$, one of the groups $Y_1$ through $Y_4$, one of the groups $Y_5$ through $Y_8$, and one of the groups $Y_9$ through $Y_{12}$. These will be at the same relative position in three different submemory sections specified by a single index register. Pulses will then be induced in all three S conductors of each tier, amplified by the amplifiers 314, 315, and 316 and applied to the memory read out circuits 313. To read out a 24 bit word or two 12 bit words, only two addresses are selected, one in the CA section and the other in the CC section.

Figure 5:
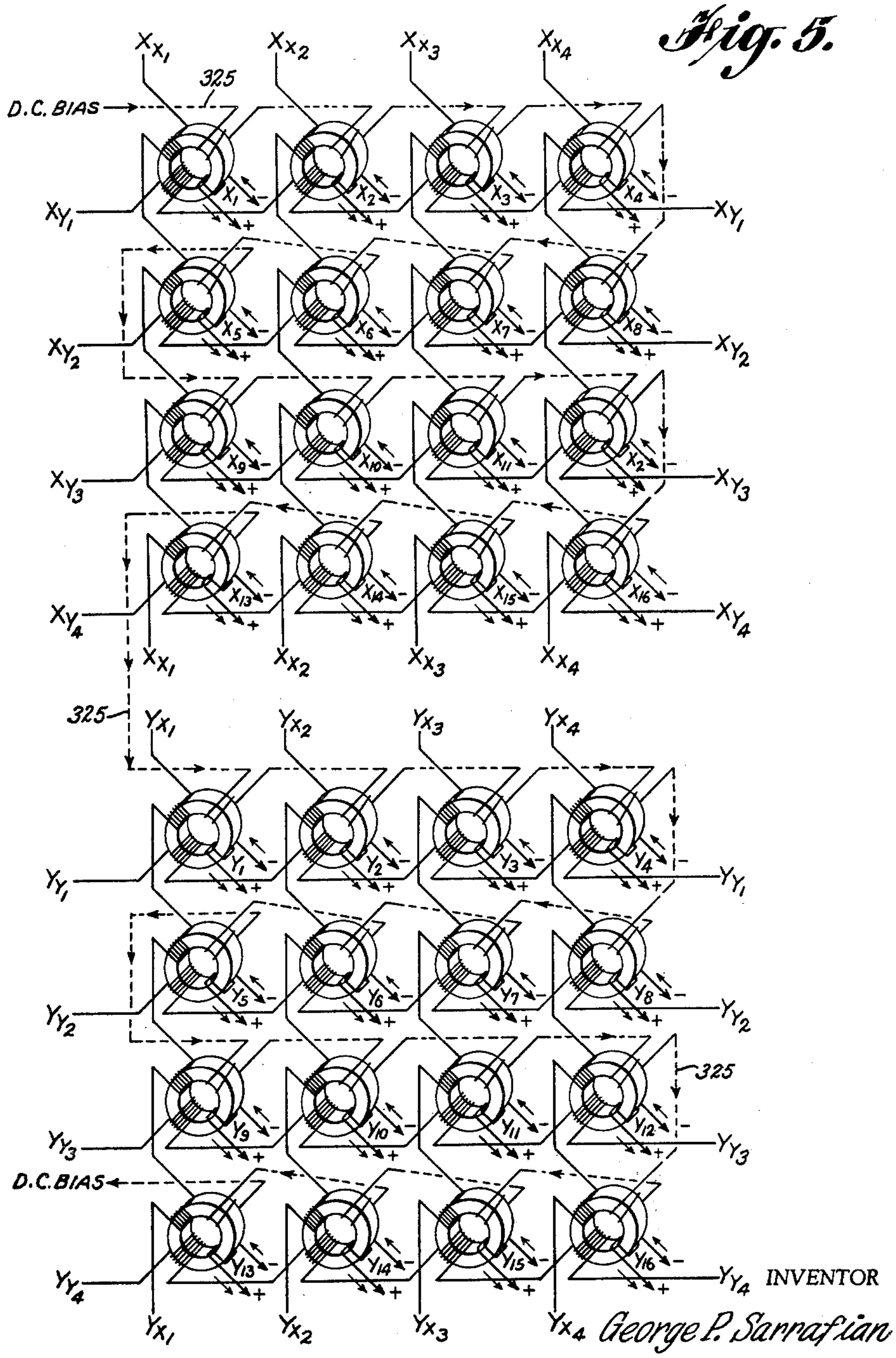
FIGURE 5 illustrates the details of the switch core matrices used for selecting and driving the input conductors of the storage core matrix.

The detailed circuitry of the switch core matrices 302 is illustrated in FIGURE 5. The switch core matrices comprise 32 permalloy tape-wound bobbin cores of the type having square hysteresis loops. The outputs from the switch core matrix positioned at the top of FIGURE 5 drive the series connected groups of conductors $X_1$, through $X_{16}$ of the storage matrix. This switch core matrix shall be referred to as the X switch core matrix. The outputs from the 16 cores shown at the bottom of FIGURE 5 drive the series connected groups of conductors $Y_1$ through $Y_{16}$ of the storage core matrix. This switch core matrix shall be referred to as the Y switch core matrix. The particular series connected group of conductors which each switch core drives is indicated at the output of each core. A conductor 325 is wound around each one of the 32 switch cores in series. A D.C. bias current is applied to the conductor 325 to bias the switch cores well into one of their stable states. Both the X switch core matrix and the Y switch core matrix are each arranged into columns and rows of four. In addition to the bias winding and the output winding, each switch core has two additional windings which shall be referred to as the first winding and the second winding. In the X switch core matrix, the first windings of all the cores which are in the same column are connected in series to form four conductors which are designated $X_{x1}$ through $X_{x4}$. In the X switch core matrix, the second winding of all the cores which are in the same rows are connected in series to form four conductors $X_{y1}$ through $X_{y4}$, respectively. Likewise, the first and second windings of the Y switch core matrices are series connected in columns and rows to form the conductors $Y_{x1}$ through $Y_{x4}$ and $Y_{y1}$ through $Y_{y4}$, respectively.

The X and Y switch core matrices operate in the same manner and any selected one of the X switch cores and any selected one of the Y switch cores can be operated to produce simultaneously the current wave form 318. This operation is done by driving a selected one of the conductors $X_{x1}$ through $X_{x4}$, a selected one of the conductors $X_{y1}$ through $X_{y4}$, a selected one of the conductors $Y_{x1}$ through $Y_{x4}$, and a selected one of the conductors $Y_{y1}$ through $Y_{y4}$ simultaneously with a wave form 321 shown in FIGURE 4. The wave form 321 comprises an elongated current pulse 326. This current pulse 326, when applied to the first or second windings of one of the switch cores, will have a polarity to cause a magnetization of the core in a direction opposite to that caused by the D.C. bias applied on conductor 325. One current pulse 326 alone, when applied to one of the windings of one of the switch cores, is insufficient to overcome the bias applied to the core over conductor 325 and therefore the core will remain in the stable state to which it is biased. However, when current pulse 326 is applied to both the first and second windings, the bias current will be more than cancelled out and the switch core will switch to the opposite state at the beginning of the application of pulse 326 and thus the pulse 322 will be induced in the output winding of the switch core. When the pulse 326 ends, the bias current will switch the switch core back to its original state, and the pulse 323 will then be induced in the output winding of the switch core. Thus by the selection of the proper one of the conductors $X_{x1}$ through $X_{x4}$ and $X_{y1}$ through $X_{y4}$ any one of the cores of the X switch core matrix can be selected, and operated to produce the output pulses 322 and 323. Similarly, one of the cores of the Y switch core matrix can be selected and operated simultaneously with the X cores to produce the pulses 322 and 323.

Thus, to operate the switch core matrices, the wave form 321 must be applied simultaneously to one of the input conductors $Y_{x1}$ through $Y_{x4}$, one of the input conductors $X_{y1}$ through $X_{y4}$, one of the input conductors $Y_{x1}$ through $Y_{x4}$, and one of the input conductors $Y_{y1}$ through $Y_{y4}$. The wave form 321 is generated by the memory programmer, designated 306 in FIGURE 1 and applied to the selected input conductors of the switch core matrices through the X and Y drivers 305.

When two 12 bit words are to be entered in the storage core matrix simultaneously, the current wave form 321 will be applied to one of the input conductors $X_{x1}$ through $X_{x4}$, to one of the input conductors $X_{y1}$ and $X_{y2}$, one of the input conductors $Y_{x1}$ through $Y_{x4}$, one of the input conductors $Y_{y1}$ and $Y_{y2}$ and one of the input conductors $Y_{y3}$ and $Y_{y4}$. When a 24 bit word is to be stored, the input conductors $Y_{y1}$ and $Y_{y3}$ should be selected. When three 12 bit words are to be read out of the storage core matrix, or one 12 bit word and one 24 bit word, the current wave form 321 will be applied to the conductor $Y_{y1}$, to the conductor $Y_{y2}$, and to the conductor $Y_{y3}$ as well as one of the conductors $Y_{x1}$ through $Y_{x4}$, one of the conductors $X_{y1}$ and $X_{y2}$, and one of the conductors $X_{x1}$ through $X_{x4}$. When two 12 bit words or a 24 bit word are to be read out, the conductor $Y_{y1}$ and the conductor $Y_{y3}$ will receive the current wave form 321. Of course, one of the conductors $Y_{x1}$ through $Y_{x4}$, one of the conductors $X_{x1}$ through $X_{x4}$ and one of the conductors $X_{y1}$ and $X_{y2}$ must also receive the current wave form 321 when two 12 bit words are to be read out.

As is described in the copending application Serial No. 784,358 of George Philip Sarrafian, Charles L. Kettler, and George T. Baker filed December 31, 1958, the operation of the memory system is controlled by a control unit, which carries out this function by giving commands in a sequence in accordance with the computer program. These commands are given to the memory system by applying signals to different inputs, each of which in response to one of the applied signals will cause the respective command to be carried out.

When a binary word is to be stored in or read out of the storage core matrix, the control unit will give a command initiating the storing or read out operation and selecting the section of the memory into or out of which the word is to be read. The command WBM will cause a word to be entered into the B section of the storage core matrix. The command WCA will cause a word to be entered into the CA section of the storage core matrix. The command WCB will cause a word to be entered into the CB section of the storage core matrix. The command WCC will cause a word to be entered into the CC section of the storage core matrix. The command WCD will cause a word to be entered into the CD section of the storage core matrix. The command RBM will cause a word to be read out of the B section of storage core matrix. The command RCA will cause a word to be read out of the CA section of the storage core matrix. The command RCB will cause a word stored in the CB section of the storage core matrix to be read out. The command RCC will cause a word stored in the CC section of the storage core matrix to be read out. The command RCD will cause the word stored in the CD section of the storage core matrix to be read out.

The particular word position or address in the section of the memory selected is determined by the binary number stored in one or five index registers which are designated generally in FIGURE 1 by the reference number 310. The control unit of the computer will give a command to select a particular one of the index registers. Two of the five index registers are used exclusively to select addresses in the B section of the storage core matrix. These two index registers shall be referred to as the B1 and B2 index registers. The remaining three index registers are used exclusively to select addresses in the CA, CB, CC and CD sections of the storage core matrix. These index registers shall be referred to as the C1, C2 and C3 index registers. The commands SB1 and SB2 cause the B1 and B2 registers, respectively, to be selected and the commands SC1, SC2, and SC3 cause the C1, C2 and C3 registers, respectively, to be selected. To carry out the process of selecting a desired address in the selected section of the storage core matrix, the correct input conductors of the switch core matrices must be selected in response to the binary number stored in the selected index register. This selection of input conductors is carried out by the B register decoder 307 and the C register decoder 308.

Figure 6:
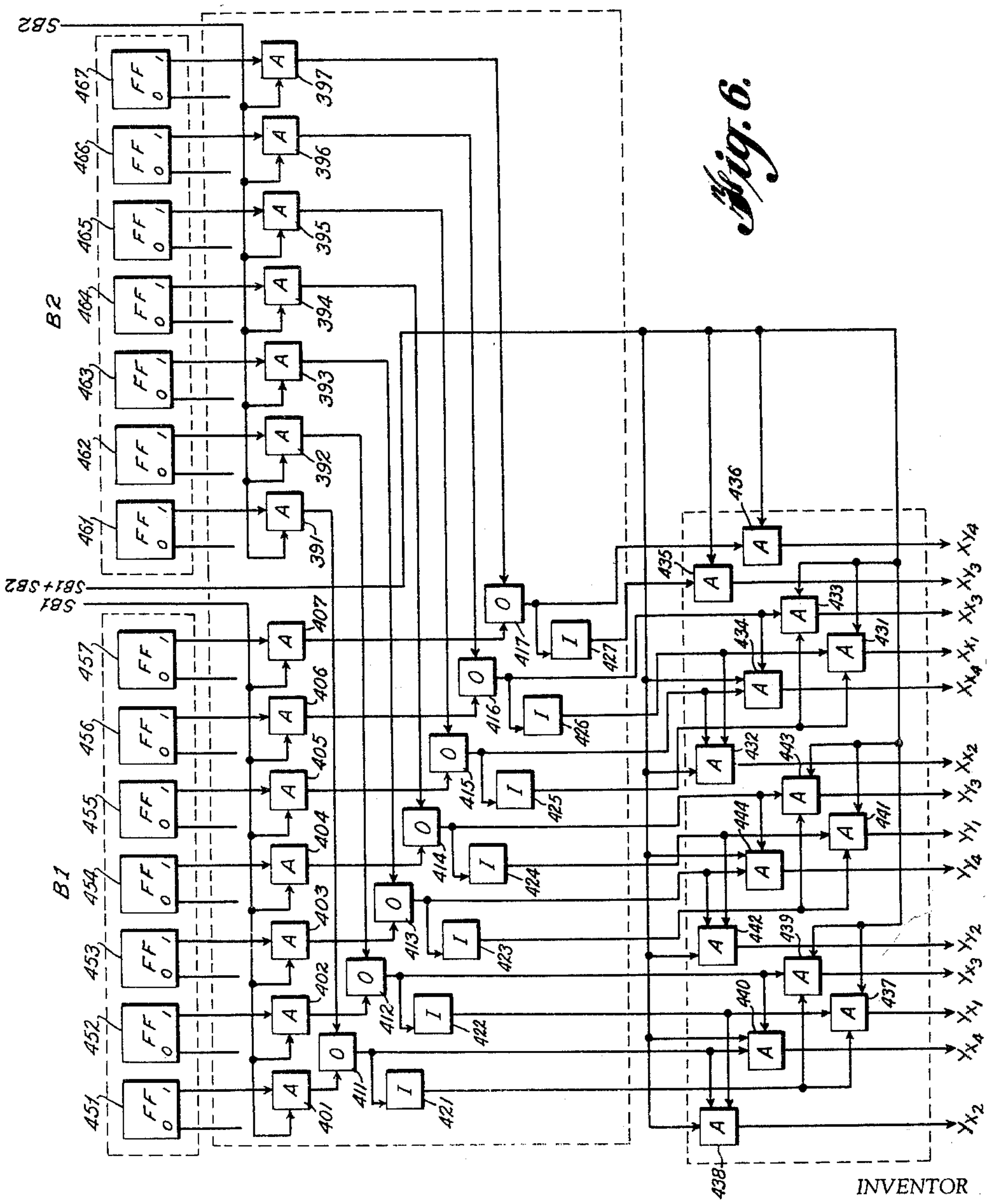
FIGURES 6 and 7 show in block form the details of the index register decoders, which, in response to binary numbers stored in the index registers, will select input conductors of the switch core matrices and thereby select addresses in the storage core matrix.

The details of the B register decoder are illustrated in FIGURE 6. As shown in this figure, the B1 register comprises seven flip-flops 451 through 457 to store a seven digit binary number. The ONE outputs from the flip-flops 451 through 457 are applied to inputs of AND gates 401 through 407, respectively. The AND gates 401 through 407 each have two inputs. When the command SB1 is given, the index register selection logic 311 (FIGURE 1) will apply a signal to the other input of each of the AND gates 401 through 407. The outputs from the AND gates 401 through 407 are applied to a series of seven OR gates 411 through 417 respectively. The B2 register comprises seven flip-flops 461 through 467. The ONE outputs of the flip-flops 461 through 467 are applied to inputs of the AND gates 391 through 397 respectively. The AND gates 391 through 397 each have two inputs. When the command SB2 is given, the index register selection logic 311 will apply a signal to the other input of each of the AND gates 391 through 397. The outputs from the AND gates 391 through 397 are applied to the OR gates 411 through 417, respectively. When the command SB1 is given, signals will pass from the ONE outputs of those of the flip-flops 451 through 457 which contain ONE's through the enabled AND gates 401, respectively and through OR gates 411 through 417, respectively. When the command SB2 is given, signals will pass from the ONE outputs of those of the flip-flops 461 through 467 which contain ONE's through the AND gates 391 through 397, respectively, through the OR gates 411 through 417, respectively. Thus, the OR gates 411 through 417 will produce output signals in accordance with the ONE's stored in the flip-flops 451 through 457, respectively, whenever the command SB1 is given, and in accordance with the ONE's stored in the flip-flops 461 through 467 whenever the command SB2 is given. The outputs from the OR gates 411 through 417 are applied to the inputs of inverters 421 through 427, respectively. Each of the inverters 421 through 427 will produce a signal at its output whenever it does not receive a signal at its input. Thus, the inverters 421 through 427 will produce output signals in accordance with the ZERO's stored in the flip-flops 451 through 457 whenever the command SB1 is given and in accordance with the ZERO's stored in the flip-flops 461 through 467 whenever the command SB2 is given.

The outputs from the OR gates 411 through 417 and the outputs from the inverters 421 through 427 are applied in different combinations to a series of 14 AND gates 431 through 444. The AND gates 431 through 434 and 437 through 444 each have three inputs and the AND gates 435 and 436 each have two inputs. Whenever either the command SB1 or SB2 is given, the index register selection logic 311 will apply a signal to one of the inputs of each of the AND gates 431 through 444. The input to the B register decoder over which this signal is applied is designated by the logical symbolism SB1+SB2. The output from the inverter 421 is applied to inputs of the AND gates 437 and 439. The output from the inverter 422 is applied to inputs of the AND gates 437 and 438. The output from the inverter 423 is applied to inputs of the AND gates 441 and 443. The output from the inverter 424 is applied to inputs of the AND gates 441 and 442. The output from the inverter 425 is applied to inputs of the AND gates 431 and 433. The output from the inverter 426 is applied to inputs of the AND gates 431 and 432. The output from the inverter 427 is applied to an input of the AND gate 435. The output from the OR gate 411 is applied to inputs of the AND gates 438 and 440 and the output from the OR gate 412 is applied to inputs of the AND gates 439 and 440. The output from the OR gate 413 is applied to inputs of the AND gates 442 and 444 and the output of the OR gate 414 is applied to inputs of the AND gates 443 and 444. The output from the OR gate 415 is applied to inputs of the AND gates 432 and 434 and the output from the OR gate 416 is applied to inputs of the AND gates 433 and 434. The output from the OR gate 417 is applied to an input of the AND gate 436. The AND gates 431 through 434 and 437 through 444 each will produce an output signal whenever signals are applied to all three of its inputs and each of the AND gates 435 and 436 will produce an output signal whenever signals are applied to both its inputs. Thus, the AND gates 431 through 444 will produce output signals in combinations responsive to the binary number stored in the B1 register whenever the command SB1 is given and responsive to the binary number stored in the B2 register whenever the command SB2 is given. For example, if the selected register contains the binary number 1010101, the AND gates 432, 436, 438 and 442 will produce output signals.

The output signals produced by the AND gates 431 through 444 will cause the X and Y drivers 305 to apply the current wave form 321 to selected ones of the input conductors $X_{x1}$ through $X_{x4}$, $X_{y3}$, $X_{y4}$, $Y_{x1}$ through $Y_{x4}$, and $Y_{y1}$ through $Y_{y4}$, respectively, of the switch core matrices 302.

Figure 7:
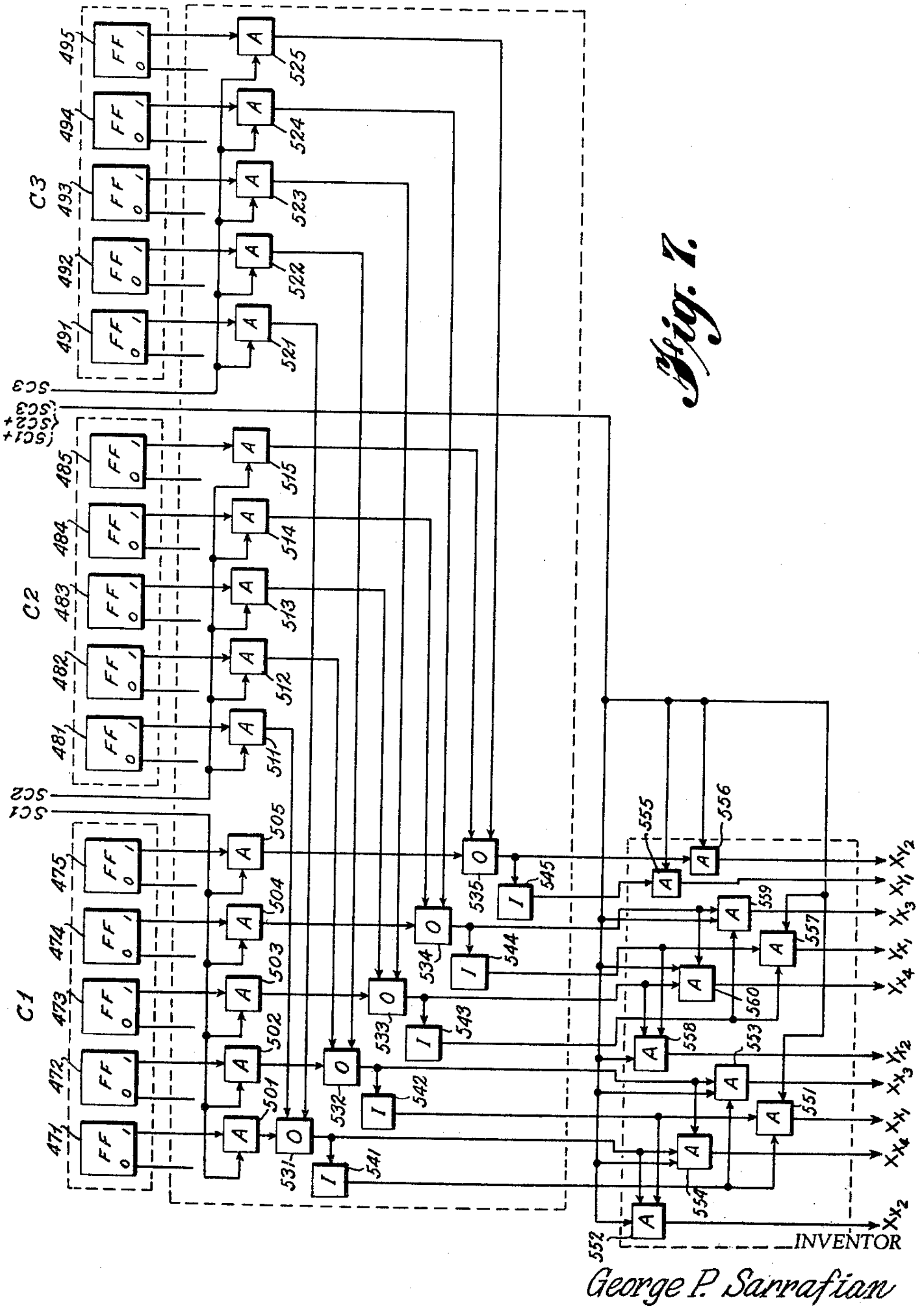

FIGURE 7 illustrates the details of the C register decoder. The C1 register comprises five flip-flops 471 through 475 to store five digit binary numbers. The ONE outputs of the flip-flops 471 through 475 are applied to inputs of the AND gates 501 through 505, respectively. The outputs of the AND gates 501 through 505 are applied to OR gates 531 through 535, respectively. The C2 register comprises five flip-flops 481 through 485. The ONE outputs of the flip-flops 481 through 485 of the OR register are applied to inputs of AND gates 511 through 515, respectively. The outputs of the AND gates 511 through 515 are applied to the OR gates 531 through 535, respectively. The C3 register comprises five flip-flops 491 through 495, respectively. The ONE outputs of the flip-flops 491 through 495 are applied to inputs of AND gates 521 through 525, respectively. The outputs of the AND gates 521 through 525 are applied to the OR gates 531 through 535, respectively. The AND gates 501 through 505, 511 through 515, 521 through 525 each have two inputs. The other inputs of the AND gates 501 through 505 will have a signal applied thereto by the index register selection logic 311 whenever the command SC1 is given. The other inputs of the AND gates 511 through 515 will have a signal applied thereto by the index register selection logic 311 whenever the command SC2 is given and the AND gates 521 through 525 will have a signal applied thereto by the index register selection logic 311 whenever the command SC3 is given. When the command SC1 is given, signals will pass from the ONE outputs of those of the flip-flops 471 through 475 which contain ONE's through the AND gates 501 through 505, respectively, and through the OR gates 531 through 535, respectively. When the command SC2 is given, signals will pass from the ONE outputs of those of the flip-flops 481 through 485 which contain ONE's through the AND gates 511 through 515, respectively, and through the OR gates 531 through 535, respectively. When the command SC3 is given, signals will pass from the ONE outputs of those of the flip-flops 491 through 495 which contain ONE's through the AND gates 521 through 525, respectively, and through the OR gates 531 through 535, respectively. Thus, the OR gates 531 through 535 will produce output signals in accordance with ONE's stored in the flip-flops 471 through 475 respectively, whenever the command SC1 is given, in accordance with the ONE's stored in the flip-flops 481 through 485, respectively, whenever the command SC2 is given, and in accordance with the ONE's stored in the flip-flops 491 through 495, respectively, whenever the command SC3 is given.

The output signals from the OR gates 531 through 535 are applied to the inputs of inverters 541 through 545. Each of the inverters 541 through 545 will produce an output signal whenever it does not receive a signal applied to its input. Thus, the inverters 541 through 545 will produce output signals in accordance with the ZERO's stored in the flip-flops 471 through 475, respectively, whenever the command SC1 is given, in accordance with the ZERO's stored in the flip-flops 481 through 485, respectively, whenever the command SC2 is given, and in accordance with the ZERO's stored in the flip-flops 491 through 495, respectively, whenever the command SC3 is given.

The outputs from the inverters 541 through 545 and the OR gates 531 through 535 are applied in different combinations to the AND gates 551 through 560. The AND gates 551 through 554 and 557 through 560 each have three inputs and the AND gates 555 and 556 have two inputs. Whenever any one of the commands SC1, SC2, or SC3 is given, the index register selection logic 311 will apply a signal to one of the inputs of each of the AND gates 551 through 560. This signal will be applied on the input in FIGURE 7 designated by the logical symbolism SC1+SC2+SC3. The output from the OR gate 531 is applied to inputs of the AND gates 552 and 554. The output from the OR gate 532 is applied to inputs of the AND gates 553 and 554. The output from the OR gate 533 is applied to inputs of the AND gates 558 and 560. The output from the OR gate 534 is applied to inputs of the AND gates 559 and 560 and the output from the OR gate 535 is applied to an input of the AND gate 556. The output from the inverter 541 is applied to inputs of the AND gates 551 and 553. The output from the inverter 542 is applied to inputs of the AND gates 551 and 552. The output from the inverter 543 is applied to inputs of the AND gates 557 and 559. The output from the inverter 544 is applied to inputs of the AND gates 557 and 558 and the output from the inverter 545 is applied to an input of the AND gate 555. Each of the AND gates 551 through 554 and 557 through 560 will produce an output signal whenever signals are applied to all three of its inputs and the AND gates 555 and 556 each will produce an output signal whenever signals are applied to both of its inputs. The AND gates 551 through 560 will therefore produce output signals in combinations responsive to the binary number stored in the C1 register whenever the command SC1 is given, responsive to the binary number stored in the C2 register whenever the command SC2 is given, and responsive to the binary number stored in the C3 register whenever the command SC3 is given. For example, if the selected one of the C1, C2, or C3 registers contains the binary number 10101, the AND gates 552, 556 and 558 will produce output signals.

The signals produced by the AND gates 551 through 560 will cause the X and Y drivers 305 to apply the current wave form 321 to the input conductors $X_{x1}$ through $X_{x4}$, $X_{y1}$, $X_{y2}$, and $Y_{x1}$ through $Y_{x4}$, respectively, of the switch core matrices 302. In this manner, the binary number stored in the selected index register controls the selection of the address in the selected section of the storage core matrix.

Figure 8:
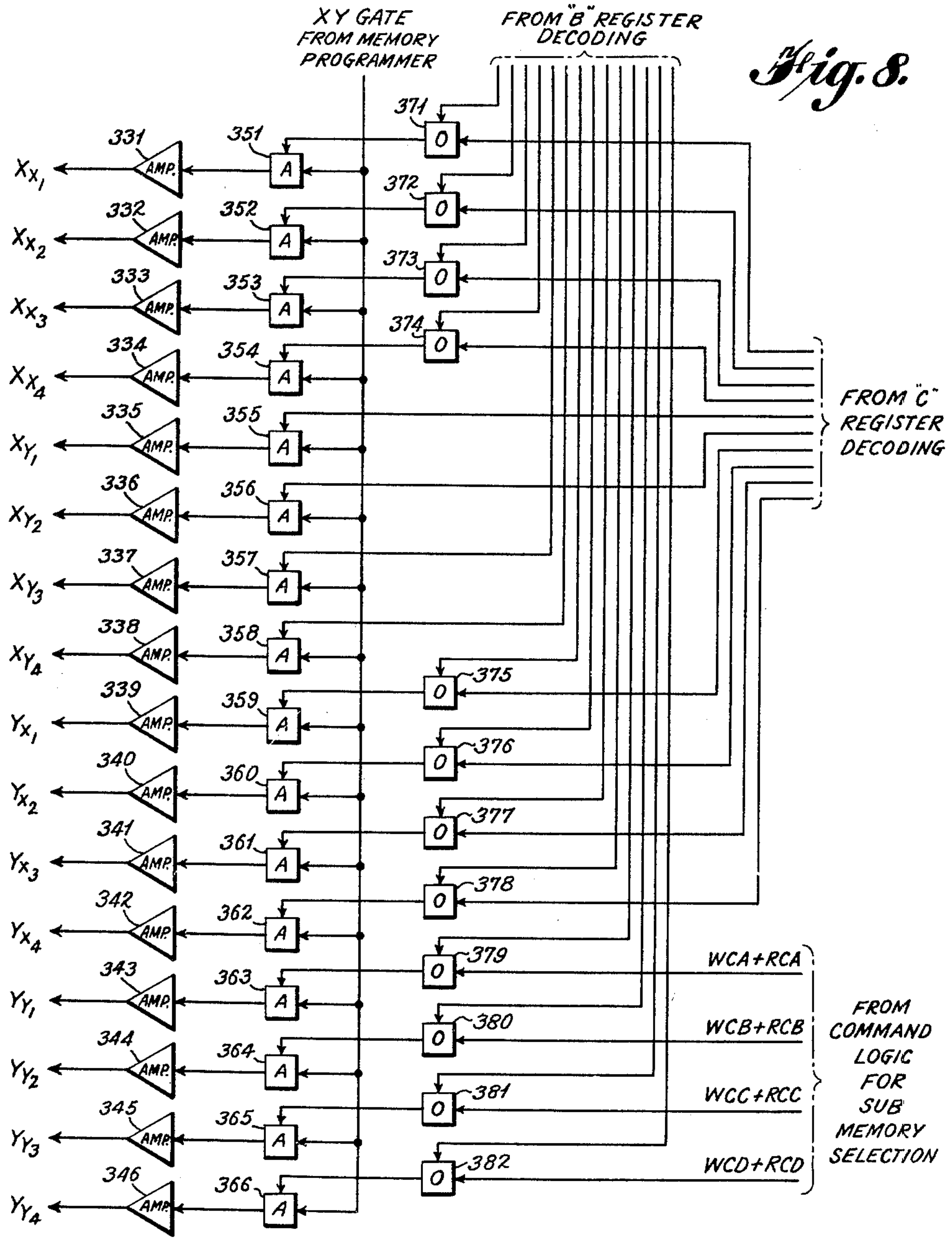
FIGURE 8 illustrates in block form the details of the X and Y drivers, which drive the input conductors of the switch core matrices.

FIGURE 8 illustrates the details of the X and Y drivers 305. As shown in this figure, the X and Y drivers comprise 16 AND gates 351 through 366, the outputs of which are applied through amplifiers 331 through 346, respectively, to the input conductors $X_{x1}$ through $X_{x4}$, $X_{y1}$ through $X_{y4}$, $Y_{x1}$ through $Y_{x4}$, and $Y_{y1}$ through $Y_{y4}$, respectively, of the switch core matrices 302. The AND gates 351 through 366 each have two inputs. To one of the inputs of each of these AND gates the current wave form 321 is applied from the memory programmer 306. The outputs from OR gates 371 through 382 are applied to the other inputs of the AND gates 351 through 354 and 359 through 366, respectively. The outputs from the AND gates 431 through 434 and 437 through 444 of the B register decoder 307 are applied to the OR gates 371 through 382, respectively. The outputs from the AND gates 435 and 436 are applied to the other inputs of the AND gates 357 and 358, respectively. The outputs from the AND gates 551 through 554 and 557 through 560 of the C register decoder 308 are applied to the OR gates 371 through 378, respectively. The outputs of the AND gates 555 and 556 are applied to the other inputs of the AND gates 355 and 356, respectively. The command logic for the submemory selection designated 309 in FIGURE 1 will apply a signal to the OR gate 379 whenever either of the commands WCA or RCA is given. The command logic for the submemory selection 309 will apply a signal to the OR gate 380 whenever either the command WCB or the command RCB is given. The command logic for the submemory selection 309 will apply a signal to the OR gate 381 when either command WCC or the command RCC is given and will apply a signal to the OR gate 382 when either the command WCD or the command RCD is given. The current wave form 321 will pass through those of the AND gates 351 through 366 which have signals applied to their other inputs, through the ampilfiers 331 through 346, respectively, to the selected input conductors of the switch core matrices. Whenever a word is entered into or read out of the storage core matrix, one of the AND gates 351 through 354 will receive a signal on its other input, one of the AND gates 355 through 358 will receive a signal on its other input, one of the AND gates 359 through 362 will receive a signal on its other input and one of the AND gates 363 through 366 will receive a signal on its other input. Thus, one of the input conductors $X_{x1}$ through $X_{x4}$, one of the input conductors $X_{y1}$ through $X_{y4}$, one of the input conductors $Y_{x1}$ through $Y_{x4}$, and one of the input conductors $Y_{y1}$ through $Y_{y4}$ will receive the current wave form 321.

Whenever two 12 bit words are to be entered into the storage core matrix simultaneously, both one of the commands WCA and WCB and one of the commands WCC and WCD must be given. In response to these commands, the command logic for submemory selection will apply a signal both to one of the AND gates 363 and 364 and to one of the AND gates 365 and 366. As a result, the current wave form 321 will be applied to both one of the input conductors $Y_{y1}$ and $Y_{y2}$ and one of the input conductors $Y_{y3}$ and $Y_{y4}$. Whenever a 24 bit word is to be entered into the storage core matrix, the commands WCA and WCC will be given.

Whenever one 12 bit word and one 24 bit word or three 12 bit words are to be simultaneously read out of the storage core matrix the commands RCA, RCB, and RCC must be given. The command logic for submemory selection will then apply a signal to the AND gates 363, 364 and 365 through OR gates 379, 380 and 381, respectively. As a result, the current wave form 321 will be applied to the input conductors $Y_{y1}$, $Y_{y2}$ and $Y_{y3}$. When two 12 bit words or one 24 bit word is to be read out from the storage core matrix, the commands RCA and RCC must be given. The current wave form 321 will then be applied to the input conductors $Y_{y1}$ and $Y_{y3}$.

It will be observed that in all of these simultaneous read in and read out operations the selected addresses always will occupy the same relative position in the selected sections of the storage core matrix and a single binary number in the selected index register controls the addresses within the selected sections of all the words simultaneously entered in or read out.

As described in the copending application Serial No. 784,358 of George Philip Sarrafian, Charles L. Kettler and George T. Baker, filed December 31, 1958, digital words are transferred to and from the memory system by means of a central information distribution unit, which has a capacity for 12 bit words, and the memory accumulator bus and the accumulator memory bus, which each have a capacity for 24 bit words.

Figures 9, 11:
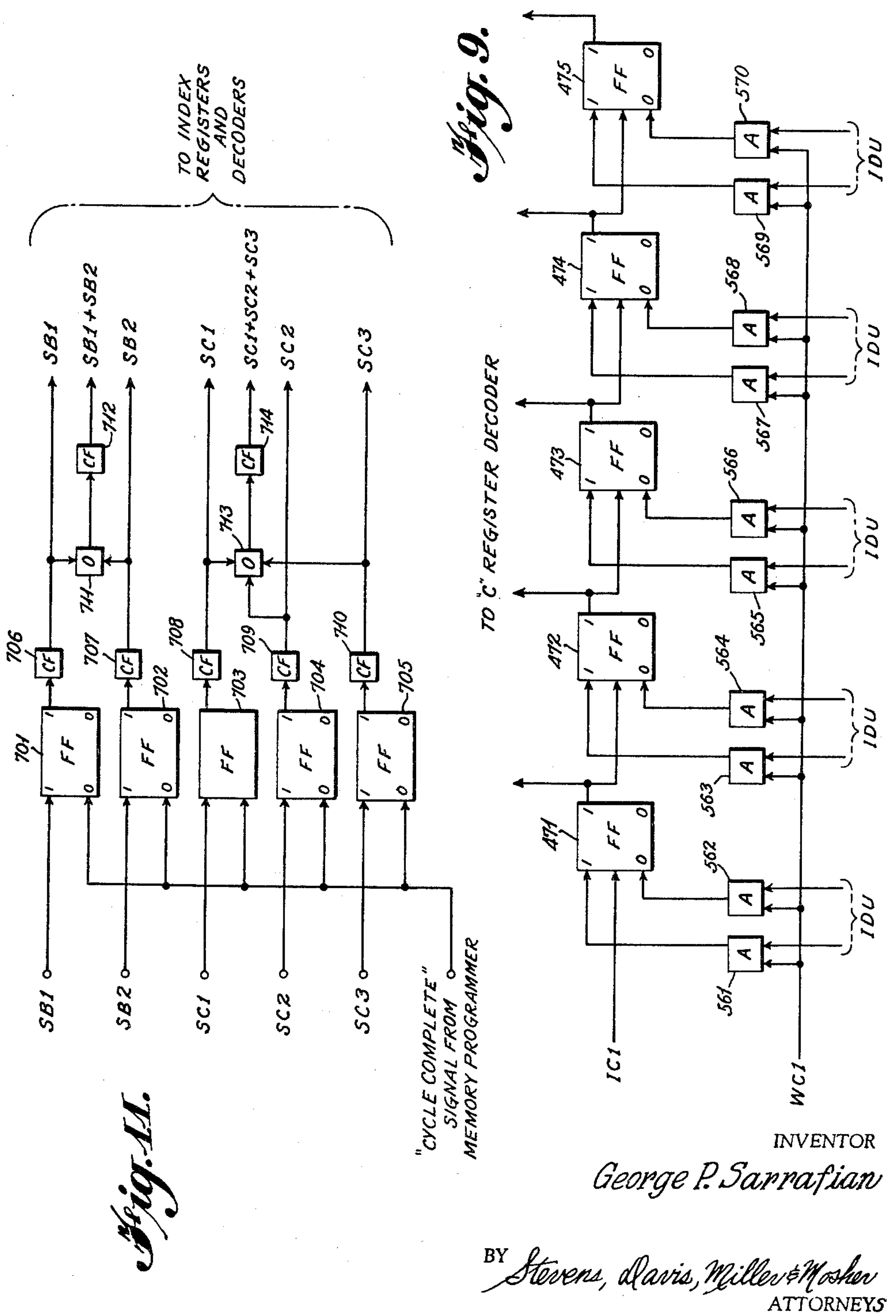
FIGURE 9 illustrates one of the index registers in block form.
FIGURE 11 illustrates in block form the index register selection logic, which stores commands selecting one of the index registers and applies the required signals to the index registers and to the index register decoders.

FIGURE 9 illustrates the details of the C1 register, which, as stated above with reference to FIGURE 7, comprises five flip-flops 471 through 475. The command designated WC1 is the signal to cause binary numbers existing in the lower five stages of the information distribution unit to be stored in the C1 register. When the command signal WC1 is given the control unit will apply a signal to enable AND gates 561 through 570. The binary number existing in the lower five stages of the information distribution unit will then pass through the AND gates 561 through 570 to be registered in the flip-flops 471 through 475.

The command signal designated IC1 will cause the binary number stored in the C1 register to increase by one. When the command IC1 is given, the control unit will apply a signal to the flip-flop 471 causing it to switch to its opposite state. If the flip-flop 471 is switched from its ONE state to its ZERO state, it will apply a signal to flip-flop 472 which will cause the flip-flop 472 to switch to its opposite state. If the flip-flop 472 is switched from its ONE state to its ZERO state it will apply a signal to the flip-flop 473 and cause the flip-flop 473 to switch to its opposite state. The flip-flop 473 and the flip-flop 474 likewise cause the flip-flops 474 and 475, respectively, to switch to their opposite states if the flip-flops 473 and 474, respectively, are switched to their ZERO states. Thus, the flip-flops 471 through 475 are connected as a binary counter and whenever the command IC1 is given the binary number stored in the C1 register will be increased by one.

The C2 register is exactly the same as a C1 register. The command to cause the five bit binary number existing in the lower five stages of the information distribution unit to be registered in the C2 register is designated WC2 and the command to cause the binary number registered in the C2 register to be increased by one is designated IC2.

The B1 and B2 registers are also similar to the C1 register except that they comprise seven flip-flops instead of five. The commands WB1 and WB2 will cause the seven bit binary number existing in the lower seven stages of the information distribution unit to be registered in the B1 and B2 registers, respectively. The commands IB1 and IB2 will cause the contents of the B1 and B2 registers, respectively, to be increased by one.

Figure 10:
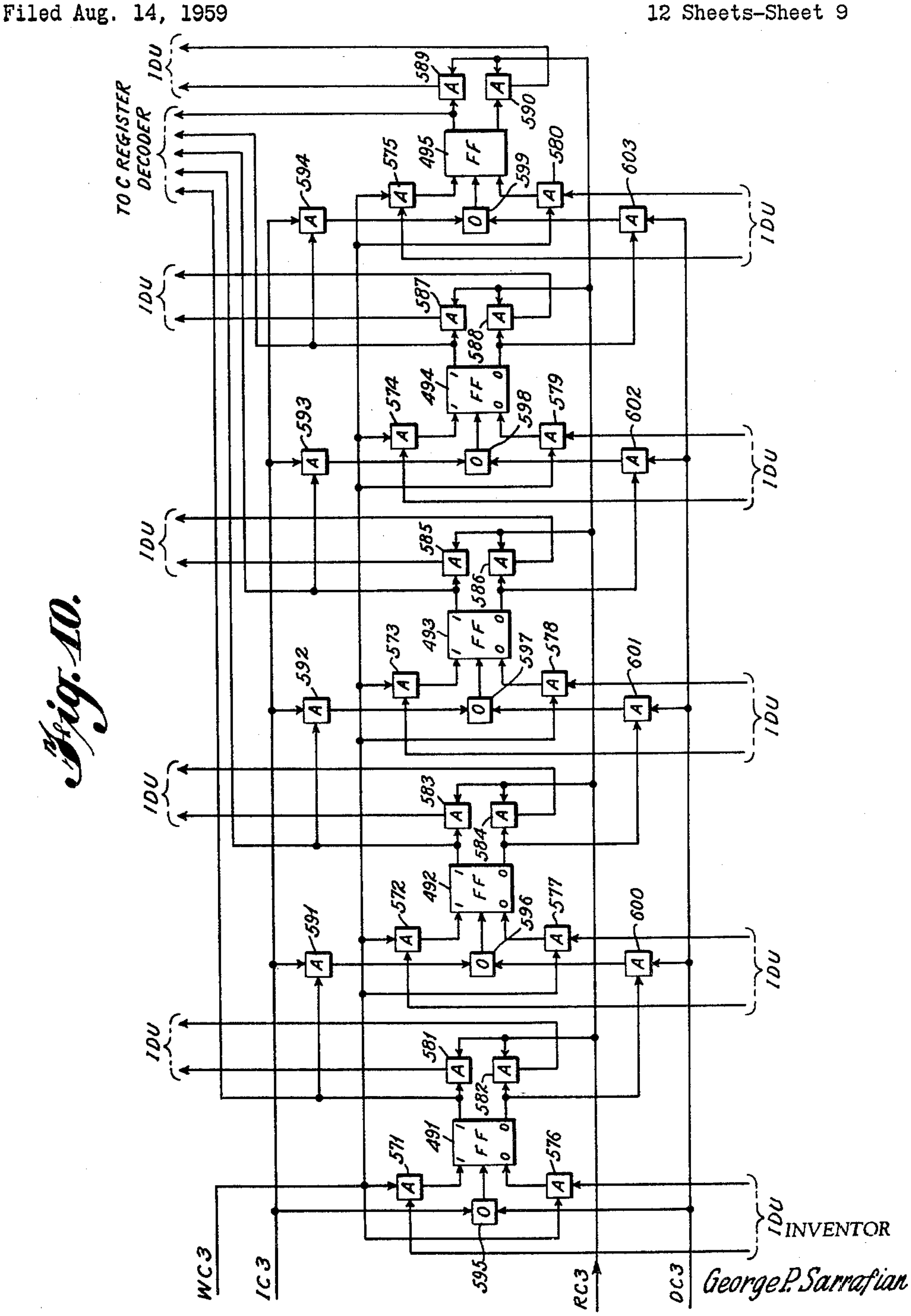
FIGURE 10 illustrates another of the index registers in block form.

The details of the C3 register are shown in FIGURE 10. As stated above with reference to FIGURE 7, the C3 register comprises five flip-flops 491 through 495. When the command WC3, to store the binary number existing in the lower five stages of the information distribution unit in the C3 register, is given, the control unit will apply a signal to the AND gates 571 through 580. The binary number existing in the lower 5 stages of the information distribution unit will then pass through the AND gates 571 through 580 to be registered in the flip-flops 491 through 495. Whenever the command RC3, to read the contents of the C3 register out to the lower five stages of the information distribution unit, is given, the control unit will apply a signal to AND gates 581 through 590. The contents of the flip-flops 491 through 495 will then pass through the enabled AND gates 581 through 590 to the lower five stages of the information distribution unit.

Whenever the command IC3, to increase the binary number stored in the C3 register by one, is given the control unit will apply a signal to AND gates 591 through 594. This signal from the control unit will also pass through OR gate 595 to cause the flip-flop 491 to switch to its opposite state. If, when this command is given, the flip-flop 491 switches from its ONE state to its ZERO state, the flip-flop 491 will apply a signal through the enabled AND gate 591 through OR gate 596 to cause the flip-flop 492 to switch to its opposite state. In like manner, each of the preceding flip-flops 492 through 494 will apply a signal through the enabled AND gates 592 through 594, respectively, through OR gates 597 through 599, respectively, to cause the succeeding flip-flops 493 through 495, respectively, to switch to their opposite states if the preceding flip-flop switches from its ONE state to its ZERO state when the command IC3 is given. In this manner, the number stored in the C3 register will be increased by one each time the command IC3 is given.

When the command DC3, to decrease the binary number stored in the C3 register by one, is given, the control unit will apply a signal through the OR gate 595 to cause the flip-flop 491 to switch to its opposite state. This signal is also applied to the AND gates 600 to 603. If the flip-flop 491 is switched from its ZERO to its ONE state, it will apply a signal through the enabled AND gate 600 through the OR gate 596 to cause the flip-flop 492 to switch to its opposite state. Likewise, each of the preceding flip-flops 492 through 495 will apply a signal through the enabled AND gates 601 through 603, respectively, through the OR gates 597 through 599, respectively, to cause the succeeding flip-flops 493 through 495, respectively to switch to their opposite states, if the preceding flip-flop is switched from its ZERO to its ONE state when the command DC3 is given. Thus, in this manner the binary number stored in the C3 register will be decreased by one whenever the command DC3 is given.

In summary, the number stored in the C3 register can be entered from the lower five stages of the information distribution unit, it can be read out from the C3 register into the lower five stages of the information distribution unit, it can be increased by one, or it can be decreased by one.

As described in the copending application Serial No. 784,358 of George T. Baker, Charles L. Kettler, and George Philip Sarrafian, filed December 31, 1958, the memory accumulator bus and the information distribution unit use the dual conductor system. In this system there are two conductors for each bit. When a ZERO is transferred, one of these conductors will be positive and the other will be negative. When a ONE is transferred, the potentials on the two conductors are reversed. the accumulator memory bus, however, only has one conductor for each bit which conductor will have a positive potential applied thereto when a ZERO is transferred and a negative potential when a ONE is transferred.

Figure 12:
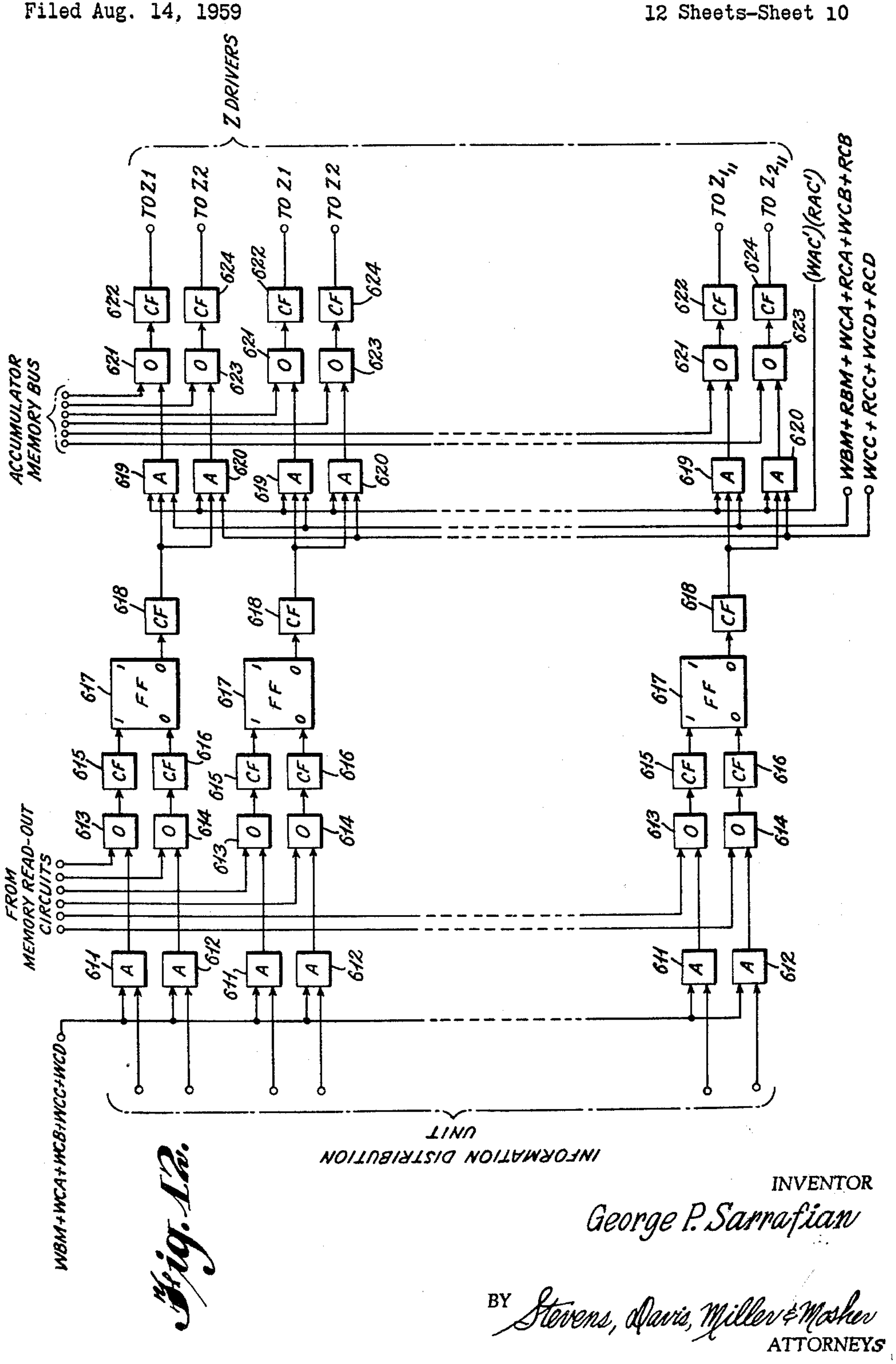
FIGURE 12 illustrates in block form the read in circuits, which control the storing of information in the storage core matrix.

The memory read in circuits designated 312 in the FIGURE 1 controls which of the Z1 drivers and which of the Z2 drivers receive the current wave form 319 and thus determine in which tiers of the storage core matrix a ZERO will be stored in the selected address or addresses. The details of the memory read in circuits are illustrated in FIGURE 12. There are twelve memory read in circuits, one for each digit of a 12 bit binary member. Each memory read in circuit controls the storing of ONE's and ZERO's in the core or cores of the selected address or addresses in a different tier of the storage core matrix. For convenience, only three of the memory read in circuits have been shown as each read in circuit is identical.

The commands to enter the word existing in the information distribution unit into the storage core matrix, are WBM, WCA, WCB, WCC, and WCD. When any of these commands are given, the command logic for submemory selection 309 will apply a signal to AND gates 611 and 612 of each read in circuit. In each read in circuit the outputs from the AND gates 611 and 612 are applied through OR gates 613 and 614, respectively, through cathode followers 615 and 616, respectively, to the ONE and ZERO inputs of a flip-flop 617. When the enabling signal is applied from the command logic for the submemory selection 309 to the AND gates 611 and 612, the 12 bit binary word existing in the information distribution unit will pass through the AND gates 611 and 612, through the OR gates 613 and 614, and through the cathode followers 615 and 616 to be registered in the 12 flip-flops 617.

In each read in circuit the ZERO output from the flip-flop 617 is applied through a cathode follower 618 to the inputs of a pair of AND gates 619 and 620. The AND gates 619 and 620 have three inputs and require an input signal applied to all three inputs to produce an output signal. A signal will be applied to the second input of each of the AND gates 619 and 620 whenever neither the command WAC nor the command RAC is given. The logic for producing this input to the AND gates 619 and 620 may be similar to that used in the command logic for submemory selection 309 or the index register selection logic 311, which are described in detail below. The command logic for submemory selection 309 will apply an enabling signal to the third input of the AND gates 619 whenever any of the commands WBM, RBM, WCA, RCA, WCB, or RCB is given. The command logic for submemory selection 309 will apply enabling signals to the third inputs of the AND gates 620 whenever any of the commands WCC, RCC, WCD, or RCD is given. The output from the AND gate 619 in each read in circuit is applied through an OR gate 621 through a cathode follower 622 to a different one of twelve Z1 drivers, which are designated in FIGURE 1 by reference number 303. The output from the AND gate 620 in each read in circuit is applied through an OR gate 623 and through the cathode follower 624 to a different one of twelve Z2 drivers, which are designated 304 in FIGURE 1.

The memory programmer 306 applies the current wave form 319 to each of the Z1 and Z2 drivers. Each of the Z1 drivers, in response to receiving a signal from the respective read in circuit, will apply the current wave form 319 to one of the Z1 conductors. Likewise, each of the Z2 drivers in response to a signal from the respective read in circuit, will apply the current wave form to one of the Z2 conductors. The Z1 and Z2 drivers 303 and 304 are not shown in detail but could comprise an AND gate and amplifier combination similar to that of the X and Y drivers 305.

When one of the commands WBM, WCA, or WCB is given, the binary word existing on the information distribution unit will be registered in the twelve flip-flops 617. Those flip-flops 617, which then contain a ZERO, will apply an output signal through the respective cathode followers 618 to the respective AND gates 619. The AND gates 619 will be enabled and thus an output signal will be produced from those AND gates 619 which receive signals from the flip-flops 617. The output signals from the AND gates 619 will be applied through the respective OR gates 621 and the respective cathode followers 622 to the respective Z1 drivers. The Z1 drivers 303 which receive signals from the respective AND gates 619 will then apply the current wave form 319 to the respective Z1 conductors. Thus, the Z1 conductors in those tiers of the storage core matrix in which a ZERO is to be stored at the selected address will receive the current wave form 319, if the selected address is in the section threaded by the Z1 conductors, and thus ZERO's will be stored in the cores of these tiers at the selected address.

When the command to store the binary word on the information distribution unit in the CC section or the CD section of the storage core matrix is given, the command logic for the submemory selection 309 will apply an enabling signal to the AND gates 611 and 612 and the binary word existing on the information distribution unit will be registered in the flip-flops 617. Those flip-flops 617, which then register a ZERO, will apply an output signal to the respective AND gates 620. The AND gates 620 will be enabled and therefore will apply an output signal to the respective Z2 drivers through the respective OR gates 623 and cathode followers 624. The Z2 drivers receiving these output signals from the memory read in circuits will then apply the current wave form 319 to the respective Z2 conductors. Thus, the Z2 conductors in those tiers of the storage core matrix in which a ZERO is to be stored at the selected address will receive the current wave form 319, if the selected address is in a section threaded by the Z2 conductors and thus ZERO's will be stored in the cores in these tiers at the selected address.

The conductor of each stage of the lower half of the accumulator memory bus is applied to the OR gate 623 in a different read in circuit. The conductor of each stage of the upper half of the accumulator memory bus is applied to the OR gate 621 in a different one of the read in circuits. When it is desired to transfer a 24 bit word from the accumulator to the storage core matrix, the command RAC will be given. This command will cause the 24 bit word registered elsewhere in the computer to be put on the accumulator memory bus, as is more fully explained in the copending application Serial No. 784,358 of George T. Baker, Charles L. Kettler and George Philip Sarrafian, filed December 31, 1958. This command will also prevent a signal from being applied to the second inputs of the AND gates 619 and 620. At the same time the command RAC is given, the commands WCA and WCC will be given. Also, one of the commands SC1, SC2, or SC3 will be given. Signals will be applied from the conductors of those stages of the lower half of the accumulator memory bus on which there are ZERO's through the respective OR gates 623 through the respective cathode followers 624 to the respective Z2 drivers. These respective Z2 drivers will then apply the current wave form 619 to the respective Z2 conductors and the lower half of the 24 bit word will be stored in the CC section of the storage core matrix at the address selected by the binary number stored in the selected index register. Signals will also be applied from the conductors of those stages of the upper half of the accumulator memory bus on which there are ZERO's through the respective OR gates 621 through the respective cathode followers 622 to the respective Z1 drivers. These respective Z1 drivers will then apply the current wave form 619 to the respective Z1 conductors and the upper half of the 24 bit word will be stored in the CA section of the memory at the address selected by the binary number in the selected index register. Two twelve bit words can be stored in the storage core matrix in the same manner. When two separate twelve bit words are simultaneously stored, it is not necessary that the CA and CC sections of the storage core matrix be selected words. The CB section of the storage core matrix may be selected instead of the CA section and the CD section may be selected instead of the CC section.

When a command to read information out from the storage core matrix to the information distribution unit is given, provision is made to restore the word read out in the position in the storage core matrix from which the word is read. Signals will be applied from the read out circuits for each tier of the storage core matrix through the OR gates 613 and 614 of each read in circuit through the cathode followers 615 and 616 to the flip-flops 617. The flip-flops 617 then will register the word read out from the selected address in the storage core matrix. The command logic for submemory selection 309 will apply an enabling signal to the AND gates 619 if the selected address is in the B section or the CA or CB section of the storage core matrix and thus signals will be applied to the Z1 drivers for those tiers from which a ZERO is read out. The current wave form 319 will then be applied to the Z1 conductors of the tiers from which a ZERO is read out. If the selected address from which the read out takes place is in the CC section or in the CD section, the command logic for submemory selection 309 will apply an enabling signal to the AND gates 620 and the read in circuits will then apply signals to the Z2 drivers for those tiers of the storage core matrix from which a ZERO was read out. In response thereto the Z2 drivers will apply the current wave form 319 to the Z2 conductors of these tiers of the storage core matrix. The read out operation takes place after the pulse 322 of the current wave form 318 but before the pulse 324 is applied to the Z conductors of those tiers of the storage core matrix from which a ZERO is read during the same cycle that the binary word is read out from the storage core matrix. Thus, the read out and restoring all takes place during one read out cycle.

There are twelve read out circuits, one for each tier of the storage core matrix. Each read out circuit is identical so only one read out circuit has been shown in FIGURE 13. The output from each of the twelve amplifiers 314, which amplify the signals induced in the S1 conductors, is applied to a different one of the read out circuits. The output from each of the twelve amplifiers 315, which amplify the signals induced in the S2 conductors, are applied to a different one of the read out circuits. The outputs from each of the twelve amplifiers 315, which amplify the signals induced in the S3 conductors, are applied to a different one of the read out circuits. The output from each of the amplifiers 314, will be applied to an inverter 632 and an AND gate 631 in one of the read out circuits. The output from each of the amplifiers 315 is applied to an AND gate 633 and an inverter 634 in one of the read out circuits. The output from each of the amplifiers 316 is applied to an AND gate 635 and in inverter 636 in one of the read out circuits.

Each of the inverters 632, 634, and 636 in each read out circuit will produce a signal at its output whenever it does not receive a signal at its input. The outputs from inverters 632, 634, and 636 are applied to AND gates 637 through 639 respectively. The memory programmer 306 applies a wave form, designated 320 in FIGURE 4, to each memory read out circuits 313 whenever a command to read out from the storage core matrix is given. This wave form contains a pulse 327 which has the time relationship shown in FIGURE 4. The wave form 320 will be applied to the AND gates 631, 633, 635 and 637 through 639 in each of the read out circuits. The outputs from the AND gates 631 and 637 are applied to AND gates 643 and 640 respectively. The outputs from the AND gates 635 and 639 are applied to AND gates 644 and 641 respectively. The outputs from the AND gates 633 and 638 are applied to OR gates 642 and 645 respectively. The command logic for the submemory selection 309 will apply an enabling signal to the AND gates 640 and 643 whenever either the command RBM or RCA is given while at the same time either the command RCA or the command RCC is not given. The outputs from the AND gates 643 and 640 are applied to the OR gates 642 and 645, respectively. The command logic for the submemory selection 309 will apply an enabling signal to the AND gates 644 and 641 whenever both the command RCC or the command RCD is given and either the command RCA or the command RCC is not given. The output from the AND gates 644 and 641 are applied to OR gates 642 and 645 respectively. In order for the AND gates 633 and 638 to produce an output signal they must receive an enabling signal from the command logic for submemory selection and this signal will be applied whenever the command RCB is given. The outputs from the AND gates 633 and 638 are applied to the OR gates 642 and 645, respectively. The outputs from the OR gates 642 and 645 in each read out circuit are applied to a different stage of the information distribution unit and the outputs are also applied to the OR gates 613 and 614, respectively, in the memory read in circuit for the same tier of the storage core matrix. The outputs from AND gates 631 and 637 in the read out circuit for each tier of the storage core matrix are applied to a different stage of the upper half of the memory accumulator bus. The output from the AND gates 635 and 639 in the read out circuit for each tier of the storage core matrix is applied to a different stage of the lower half of the memory accumulator bus.

Whenever either the command RCA or RBM is given, positive going pulses will be induced in those S1 conductors which are in tiers which contain ONE's at the selected address. These pulses will be caused by the pulse 322 of the wave form 318. Those S1 conductors which are in tiers which contain ZERO's at the selected address will have no pulses induced in them at this time. The induced pulses after being amplified by the respective amplifiers 314 are applied to the AND gates 631 and inverters 632 in the respective read out circuits. The inverters in these respective read out circuits upon receiving the induced pulses will stop applying a signal to the AND gates 637. The inherent delay in the read out system will cause the induced pulses to arrive at the AND gates 631 and inverters 632 at the time of the pulse 327 of the wave form 320. The AND gates 631 which receive pulses will therefore produce output signals at this time. The inverters 632, which are in read out circuits for tiers in which ZERO's are stored at the selected address, will not receive pulses at the time the pulse 372 is applied to the AND gate 637 and therefore the inverters 632 in these respective read out circuits will be applying signals to the AND gates 637 at this time. The AND gates 637 in those read out circuits for tiers which contain ZERO's at the selected address will therefore produce output signals at this time. Thus, the AND gates 631 and 637 in each read out circuit will produce output signals in accordance with the digit stored at the selected address in the respective tier whenever the commands RCA or RBM are given.

In the same manner the AND gates 633 and 638 will produce output signals in accordance with the digit stored at the selected address in the respective tier whenever the command RCB is given. Likewise, the AND gates 635 and 639 in each read out circuit will produce output signals in accordance with the digit stored at the selected address in the respective tier whenever the command RCC or RCD is given.

The output signals produced by the AND gates 631 and 637 will pass through the AND gates 643 and 640 if they are enabled through the OR gates 642 and 645 to the information distribution unit. The output signals produced by the AND gates 633 and 639 will pass through the AND gates 644 and 641, if enabled, through the OR gates 642 and 645 to the information distribution unit. Of course, the computer will be programmed so that only one word at a time will ever be read out to the information distribution unit. The output signals produced at the outputs of the AND gates 631 and 637 are also applied to the upper half of the memory accumulator bus and the signals produced at the outputs of the AND gates 635 and 639 are applied to the lower memory accumulator bus for reading out 24 bit words or for simultaneous multiple read out.

When it is desired to read out three 12 bit words or one 12 bit word, and one 24 bit word, the commands RCA, RCB, and RCC will be given. Signals will be produced at the outputs of the AND gates 631 and 637, 633 and 638, and 635 and 639 in accordance with the information stored at the three selected locations. The outputs from the AND gates 631 and 637 will be applied to the upper half of the memory accumulator bus, the outputs from the AND gates 635 and 639 will be applied to the lower half of the memory accumulator bus, and the outputs of the AND gates 633 and 638 will be applied to the information distribution unit. Thus, the two 12 bit words stored in the CA and CC sections will be read out to the upper and lower halves of the memory accumulator bus and the 12 bit word stored in the CB section will be read out to the information distribution unit. The signals from the AND gates 631 and 637 and the AND gates 635 and 639 will not pass to the information distribution unit because the AND gates 643 and 640 and the AND gates 644 and 641 will not receive enabling signals from the command logic for submemory selection due to the fact that both the commands RCA and RCC are given.

When a 24 bit word or two 12 bit words are to be read out, the commands RCA and RCC will be given and signals will be produced at the outputs of the AND gates 631 and 637 and the AND gates 635 and 639 in accordance with the 24 bit word stored in the two selected addresses. These signals will be passed to the lower and upper halves of the memory accumulator bus. The AND gates 643 and 640, 644 and 641 will not be enabled by a signal from the command logic for submemory selection because both the commands RCA and RCC will be given and therefore no signals will pass to the information distribution unit.

The described connections between the information distribution unit and the memory read in circuits 312, between the accumulator memory bus and the memory read in circuits 312 between the memory read in circuits 312 and the Z1 and Z2 drivers 303 and 304, between the memory read out circuits 315 and the memory read in circuits 312, between the Z1 drivers 303 and the Z1 conductors, between the Z2 drivers 304 and the Z2 conductors, between the S1 conductors and the sense amplifiers 314, between the S2 conductors and the sense amplifiers 315, between the S3 conductors and the sense amplifiers 316, between the sense amplifiers 314, 315, and 316 and the memory read out circuits 313, between the memory read out circuits 313 and the information distribution unit, and between the memory read out circuits 313 and the memory accumulator bus are all such that each digit of the binary number operated upon always is placed in the correct tier of the storage core matrix and on the correct stages of the information distribution unit, the accumulator memory bus, and the memory accumulator bus according to the order of the digit.

FIGURE 14 illustrates the details of the command logic for the submemory selection 309. The function of this circuitry is to store the signals from the control unit for the commands WBM, RBM, WCA, RCA, WCB, RCB, WCC, RCC, WCD, and RCD and to apply signals in response thereto to the X and Y drivers 305, to the memory read out circuits 313, to the memory read in circuits 312 and to the memory programmer.

When the command WBM is given a signal will be applied to the ONE input of flip-flop 721 to set this flip-flop in its ONE state. In the same manner flip-flops 722 through 730 are set into their ONE states whenever the commands RBM, WCA, RCA, WCB, RCB, WCC, RCC, WCD, and RCD, respectively, are given. Thus these commands are stored in the flip-flops 721 through 730. The ONE outputs of the flip-flops 721 through 730 are applied to cathode followers 731 to 740, respectively. Thus, the cathode followers 731 through 740 will produce output signals in accordance with the commands given. The ZERO output of the flip-flop 724 is applied to a cathode follower 741 and the cathode follower 741 therefore will produce an output signal whenever the command RCA is not given. The ZERO output of the flip-flop 728 is applied to the cathode follower 742 and hence the cathode follower 742 will produce an output signal whenever the command RCC is not given.

The outputs from the cathode followers 731 and 732 are applied to an OR gate 743. The output from the OR gate 743 is applied to a cathode follower 744. The cathode follower 744, as a result, will produce an output signal when either the command RBM or the command WBM is given. The outputs from the cathode followers 733 and 734 are applied to an OR gate 745 and the output from the OR gate 745 is applied to a cathode follower 746. Accordingly, the cathode follower 746 will produce an output signal whenever the command WCA or the command RCA is given. The outputs from the cathode followers 735 and 736 are both applied to an OR gate 747 and the output from the OR gate 747 is applied to a cathode follower 748, which therefore will produce an output signal when either the command WCB or the command RCB is given. The outputs from the cathode followers 737 and 738 are both applied to an OR gate 749 and the output from the OR gate 749 is applied to a cathode follower 750. The cathode follower 750, therefore, will produce an output signal when either the command WCC or the command RCC is given. The outputs from the cathode followers 739 and 740 are applied to an OR gate 751 and the output from the OR gate 751 is applied to a cathode follower 752. An output signal from the cathode follower 752 will then be produced whenever the command WCD or the command RCD is given.

The outputs from the cathode followers 746, 748, 750 and 752 are applied to the OR gates 379 through 382, respectively, of the X and Y drivers 305 as has been described with reference to FIGURE 8.

The outputs from the cathode followers 731, 733, 735, 737, and 739 are all applied to an OR gate 753 and the output from the OR gate 753 is applied to a cathode follower 754. The cathode follower 754 will then produce an output signal whenever any of the commands WBM, WCA, WCB, WCC, or WCD is given. This output signal is applied to the AND gates 611 and 612 of the memory read in circuits 312 as described with reference to FIGURE 12.

The outputs from the cathode followers 744, 746, and 748 are all applied to an OR gate 755 and the output from the OR gate 755 is applied to the cathode follower 756. Accordingly, the cathode follower 756 will produce an output signal whenever any of the commands WBM, RBM, WCA, RCA, WCB, or RCB is given. This output signal is applied to the AND gates 619 of the memory read in circuits as described with reference to FIGURE 12.

The output from the cathode followers 732 and 734 are applied to an OR gate 757. The output from the OR gate 757 is applied to one of the two inputs of an AND gate 758. The outputs from the cathode followers 741 and 742 are both applied to an OR gate 759 and the output from the OR gate 759 is applied to the other inputs of the AND gate 758. The output from the AND gate 758 is applied to a cathode follower 760. In accordance with this circuitry the cathode follower 760 will produce an output signal when both either the command RBM or the command RCA is given and at the same time either the command RCA or the command RCC is not given. This output signal is applied to the AND gates 643 and 640 in the memory read out circuits 313 as has been described with reference to FIGURE 13.

Figure 13:
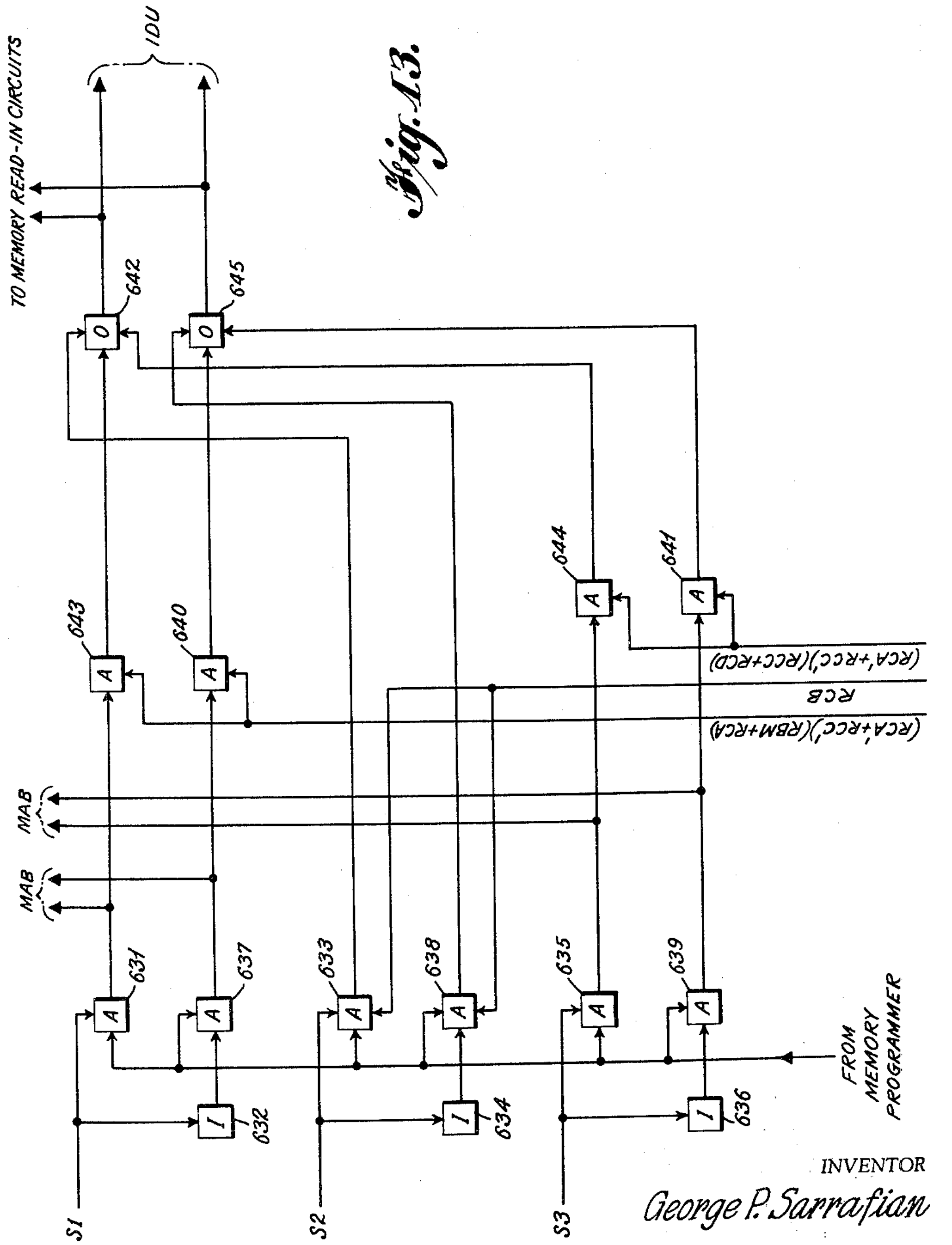
FIGURE 13 illustrates in block form one of the read out circuits, which receive the information read out from the storage core matrix.

The output from the cathode follower 736 is applied to the AND gates 633 and 638 of the read out circuits whenever the command RCB is given as has been described with reference to FIGURE 13.

The outputs from the cathode followers 738 and 740 are applied to an OR gate 763 and the output from the OR gate 763 is applied to an AND gate 764. The output from the OR gate 759 is applied to the other input of the AND gate 764. The output from the AND gate 764 is applied to a cathode follower 765. The cathode follower 765 will thus produce an output signal when both either the command RCC or the command RCD is given and either the command RCA or RCC is not given. This output signal is applied to the AND gates 641 and 644 of the memory read out circuits 313 as have been described with reference to FIGURE 13.

The outputs from the cathode follower 750 and the OR gate 763 are applied to an OR gate 766 and the output from the OR gate 766 is applied to a cathode follower 767. The cathode follower 767 will therefore produce an output signal when either the command WCC, RCC, WCD, or RCD is given. This output signal is applied to the AND gates 620 of the memory read in circuits 312 in the manner which has been described with reference to FIGURE 12.

The outputs of the cathode followers 756 and 767 are both applied to an OR gate 768 and the output from the OR gate 768 is applied to a cathode follower 769. The cathode follower 769 will produce an output signal when any of the commands WBM, RBM, WCA, RCA, WCB, RCB, WCC, RCC, WCD, or RCD is given. This output signal is applied to the memory programmer 306 to initiate its operation to produce the wave forms 321, 320 and 319.

The various outputs of the command logic for submemory selections have been indicated in logical symbolism. The logical symbolism for the outputs "W," "X," "Y," and "Z" are indicated in the legend at the bottom of FIGURE 14.

4.8 microseconds after the commands are given to set one or more of the flip-flops 721 through 730 to their ONE states, the memory programmer 706 will apply a signal to the ZERO inputs of the flip-flops 721 through 730 to switch these flip-flops to their ZERO states. This signal from the memory programmer is referred to as the cycle complete signal.

FIGURE 11 illustrates the details of the index register selection logic 311. The function of the index register selection logic is to store the commands SB1, SB2, SC1, SC2 and SC3 and, in response to these commands, to apply signals to the index register 310 and to the B and C register decoders 307 and 308. Whenever the command SB1 is given the control unit will apply a signal to the ONE input of flip-flop 701 causing this flip-flop to be set in its ONE state. Similarly, whenever the commands SB2, SC1, SC2, or SC3, are given the control unit will apply a signal to set the flip-flops 702 through 705, respectively, to their ONE states. The ONE outputs of the flip-flops 701 through 705 are applied to the cathode followers 706 through 710, respectively. Thus, the cathode followers 706 through 710 will produce output signals whenever the commands SB1, SB2, SC1, SC2, and SC3, respectively, are given.

The output of the cathode follower 706 is applied to the AND gates 401 through 407 of the B1 register as described with reference to FIGURE 6. The output of the cathode follower 707 is applied to the AND gates 391 through 397 of the B2 register as described with reference to FIGURE 6. The output of the cathode follower 708 is applied to the AND gates 501 through 505 of the C1 register as described with reference to FIGURE 7. The output of the cathode follower 709 is applied to AND gates 511 through 515 of the C2 register as described with reference to FIGURE 7. The output of the cathode follower 710 is applied to AND gates 521 through 525 of the C3 register as described with reference to FIGURE 7.

The outputs from the cathode followers 706 and 707 are applied also to an OR gate 711 and the output from the OR gate 711 is applied to the cathode follower 712. The cathode follower 712 will therefore produce an output signal either when the command SB1 or the command SB2 is given. This output signal will be applied to the AND gates 431 through 444 of the B register decoder 307 as described with reference to FIGURE 6. The outputs from the cathode followers 708, 709, and 710 are all applied to an OR gate 713 and the output from the OR gate 713 is applied to a cathode follower 714. The cathode follower 714 will therefore produce an output signal when ever either of the commands SC1, SC2, or SC3 is given and this output signal will be applied to the AND gates 551 through 560 of the C register decoder 308 as described with reference to FIGURE 7.

4.8 microseconds after the command is given to set one of the flip-flops 701 through 705 in its ONE state, the cycle complete signal will be applied from the memory programmer 306 to the ZERO inputs of the flip-flops 701 through 705 to switch the flip-flop which is in its ONE state back to its ZERO state.

FIGURE 15 illustrates the details of the memory programmer 306. Whenever any of the commands WBM, RBM, WCA, RCA, WCB, RCB, WCC, RCC, WCD, or RCD is given, the command logic for submemory selection will apply a signal to blocking oscillator 781. This signal is produced by the cathode follower 769 of the command logic for submemory selection as described with reference to FIGURE 14. In response to this signal, the blocking oscillator 781 will produce an output signal, which will be applied to a 1.6 microsecond delay line 783. The output from the delay line 783 is applied to a blocking oscillator 784. When the blocking oscillator 784 receives a signal from the delay line 783 it will apply an output signal to a 1.6 microsecond delay line 785. The delay line 785 has three tapped outputs along its length. The first output is applied to a blocking oscillator 795 and a signal will be produced from this output 0.4 microsecond after a signal is applied to the input of the delay line 785 or 2.0 microseconds after a signal is applied to the blocking oscillator 781. The second tap from the delay line 785 is applied to a blocking oscillator 789 and a signal will be produced from this output 0.6 microsecond after a signal is applied to the input of the delay line 785 or 2.2 microseconds after a signal is applied to the blocking oscillator 781. The third tap from the delay line 785 is applied to a blocking oscillator 790 and a signal at this tap will be produced 1.4 microseconds after a signal is applied to the input of the delay line 785 or 3.0 microseconds after a signal is applied to the blocking oscillator 781. The output from the end of the delay line 785 will be produced 1.6 microseconds after a signal is applied to the input of the delay line 785 or 3.2 microseconds after a signal is applied to the blocking oscillator 781. The output from the end of the delay line is applied to a blocking oscillator 786. In response to receiving a signal from the delay line 785, the blocking oscillator 786 will apply a signal to a 1.6 microsecond delay line 787. As a result, a signal will be produced from the delay line 787 4.8 microseconds after a signal is applied to the blocking oscillator 781. This signal from the delay line 787 will be applied to a blocking oscillator 788.

In response to a signal from the delay line 787, the blocking oscillator 788 will produce the cycle complete signal, which is applied to the ZERO inputs of the flip-flops 721 through 730 of the command logic for submemory selection 309 as described with reference to FIGURE 14 and to the ZERO inputs of the flip-flops 701 through 705 of the index register selection logic 311 as described with reference to FIGURE 11. The cycle complete signal will be produced 4.8 microseconds after a signal is applied to the blocking oscillator 781.

The output signal from the blocking oscillator 781 is also applied to a flip-flop 782 to cause this flip-flop to be set in its ONE state. When the output from the blocking oscillator 790 is produced after a time interval of 3.0 microseconds it will set the flip-flop 782 back to its ZERO state. As a result, the flip-flop 782 will be in its ONE state for a total time period of three microseconds. As a result, there will be produced from the ONE output of the flip-flop 782 a pulse 3.0 microseconds long starting at the time a signal is applied to the blocking oscillator 781. The ONE output from the flip-flop 782 is applied to a cathode follower 792. The output produced by the cathode follower 792 will be current wave form 321 which is applied to the AND gates 351 through 356 of the X and Y drivers 305 as described with reference to FIGURE 8.

The output from the blocking oscillator 789 is applied to the ONE input of the flip-flop 791 to cause this flip-flop to be set to its ONE state at a time 2.2 microseconds after a signal is applied to the blocking oscillator 781. The output signal from the blocking oscillator 788 causes the flip-flop 791 to switch back to its ZERO state 4.8 microseconds after a signal is applied to the blocking oscillator 781. The ONE output of the flip-flop 791 is applied to the cathode followers 793 and 794. As a result, the cathode followers 793 and 794 will produce a pulse 2.6 microseconds long starting at a time 2.2 microseconds after a signal is applied to the blocking oscillator 781 and ending at a time 4.8 microseconds after a signal is applied to the blocking oscillator 781. This output wave form from the cathode followers 793 and 794 is the current wave form 319 which is applied to the selected Z1 and Z2 conductors of the storage core matrix through the Z1 and Z2 drivers 303 and 304 in accordance with the binary word to be stored in the storage core matrix.

The blocking oscillator 795 will generate an output signal 20 microseconds after a signal is applied to the blocking oscillator 781. The output wave form from the blocking oscillator 795 is the wave form 320 which is applied to the AND gates 631, 633, 637, 638, and 639 of each read out circuit as described with reference to FIGURE 13.

The storage system has been described as being capable of reading out double length words. The system, of course, could be modified to store and read out triple length words or any multiple length words without departing from the scope of the invention.

Tiers of storage cores and switch cores have been described as being positioned in columns and rows. Actually, the cores may have any position as long as the electrical circuit is the same. Accordingly, in the claims the term "electrically arranged" is defined as referring to this electrical circuit and does not define the actual position of the cores.

The above description is of a preferred embodiment of the invention and numerous modifications could be be made thereto without departing from the spirit and scope of the invention which is limited only as defined in the appended claims.

What is claimed is:

1. A memory matrix system comprising a plurality of magnetic storage cores of the type exhibiting square hysteresis loops, said magnetic storage cores being electrically arranged in columns and rows, a plurality of column coils each inductively coupled to all the cores of a different column, a plurality of row coils each inductively coupled to all the cores of a different row, said cores being divided into a plurality of exclusive groups, a plurality of inhibit coils each inductively coupled to the cores of a different one of said exclusive groups, row coil and column coil selecting means to select row and column coils and to apply two sequential current pulses of opposite polarity simultaneously to the selected ones of said row and column coils, means for each of said inhibit coils to selectively apply a current pulse to such inhibit coils simultaneously with the later occurring one of said two sequential current pulses, said current pulse selectively applied by said last named means having a polarity to apply mmf. to said cores in a direction opposite to that applied by said second one of said two sequential current pulses, and means to cause said row and column coil selecting means simultaneously to select one of said column coils inductively coupled to a plurality of cores from each of said exclusive groups and to select a plurality of said row coils each inductively coupled to a plurality of cores of a different one of said exclusive groups.

2. A memory matrix system as in claim 1, in which said coil selecting means comprises a separate switch core matrix.

3. A memory matrix system as in claim 1 characterized by an arrangement of exclusive groups comprising a single relatively large exclusive group and a plurality of smaller exclusive groups wherein at least one inhibit winding threads through storage cores of said large exclusive group and at least one of said smaller groups.

4. A memory matrix system comprising a plurality of magnetic storage cores of the type exhibiting square hysteresis loops, said magnetic storage cores being electrically arranged in columns and rows, a plurality of column coils each inductively coupled to all the cores of a different column, a plurality of row coils each inductively coupled to all the cores of a different row, said cores being divided into a plurality of exclusive groups, a plurality of inhibit coils each inductively coupled to the cores of a different one of said exclusive groups, row coil and column coil selecting means to select row and column coils and to apply two sequential current pulses of opposite polarity simultaneously to the selected ones of said row and column coils, means for each of said inhibit coils to selectively apply a current pulse to such inhibit coils simultaneously with the later occurring one of said two sequential current pulses, said current pulse selectively applied by said last named means having a polarity to apply mmf. to said cores in a direction opposite to that applied by said second one of said two sequential current pulses, and means to cause said row and column coil selecting means simultaneously to select one of said column coils inductively coupled to a plurality of cores from each of said exclusive groups and to select a pluraltiy of said row coils each inductively coupled to a plurality of cores of a different one of said exclusive groups, sensing means interwoven selectively through the storage cores of said exclusive groups in such a manner that only one sense winding is present in any exclusive group.

References Cited in the file of this patent

UNITED STATES PATENTS

| | | |
|---|---|---|
| 2,708,267 | Weidenhammer | May 10, 1955 |
| 2,856,596 | Miller | Oct. 14, 1958 |
| 2,895,124 | Harris | July 14, 1959 |
| 2,902,677 | Counihan | Sept. 1, 1959 |
| 2,911,631 | Warren | Nov. 3, 1959 |
| 2,929,050 | Russell | Mar. 15, 1960 |
| 2,931,014 | Buchholz | Mar. 29, 1960 |

FOREIGN PATENTS

| | | |
|---|---|---|
| 769,384 | Great Britain | Mar. 6, 1957 |